US012275551B2

(12) United States Patent
Lei et al.

(10) Patent No.: US 12,275,551 B2
(45) Date of Patent: Apr. 15, 2025

(54) ROBOTIC SYSTEMS WITH MULTI-PURPOSE LABELING SYSTEMS AND METHODS

(71) Applicant: MUJIN, Inc., Tokyo (JP)

(72) Inventors: Lei Lei, Guangzhou (CN); Yixuan Zhang, Guangzhou (CN); Xu Chen, Guangzhou (CN); Yi Xu, Guangzhou (CN); Brandon Coats, Jeffersonville, IN (US); Rosen Nikolaev Diankov, Tokyo (JP)

(73) Assignee: Mujin, Inc., Tokyo (JP)

( * ) Notice: Subject to any disclaimer, the term of this patent is extended or adjusted under 35 U.S.C. 154(b) by 0 days.

(21) Appl. No.: 17/885,421

(22) Filed: Aug. 10, 2022

(65) Prior Publication Data

US 2023/0050326 A1 Feb. 16, 2023

Related U.S. Application Data

(60) Provisional application No. 63/232,665, filed on Aug. 13, 2021.

(51) Int. Cl.
*B65C 9/42* (2006.01)
*B65C 9/02* (2006.01)
(Continued)

(52) U.S. Cl.
CPC .................. *B65C 9/42* (2013.01); *B65C 9/02* (2013.01); *B65C 9/14* (2013.01); *B65C 9/46* (2013.01); *B65C 2009/401* (2013.01)

(58) Field of Classification Search
CPC .... B65C 9/42; B65C 9/14; B65C 9/46; B65C 2009/401
See application file for complete search history.

(56) References Cited

U.S. PATENT DOCUMENTS 5,209,808 A * 5/1993 Booth ........................ B65C 9/36 156/487
5,550,745 A * 8/1996 Wurz ................... B65G 1/1376 700/215

(Continued)

FOREIGN PATENT DOCUMENTS

JP 2002179040 A 6/2002
JP 2006117295 A * 5/2006 ............... B65C 7/00

(Continued)

OTHER PUBLICATIONS

Translation of JP-2006117295-A, JP-2006117295-A, Shimoda A (Year: 2006).*

(Continued)

*Primary Examiner* — George R Koch
(74) *Attorney, Agent, or Firm* — Perkins Coie LLP

(57) ABSTRACT

A multi-purpose labeling system can include a conveyor, a visual analysis module, and a labeling assembly. The conveyor can move an object in a first direction. The visual analysis module can include an optical sensor directed toward the conveyor to generate image data depicting the object. The labeling assembly can be spaced from the conveyor in a second direction and include a printer, a labeling module, and an alignment assembly. The printer can print a label based on the image data, and the labeling module can have a labeling plate for receiving the label. The alignment assembly can include a lateral-motion module, a vertical-motion module, and a rotary module for moving the labeling module along or about the first, the second, and a third direction, and can place the labeling plate adjacent to an object surface.

17 Claims, 16 Drawing Sheets

(51) Int. Cl.

| | |
|---|---|
| ***B65C 9/14*** | (2006.01) |
| ***B65C 9/40*** | (2006.01) |
| ***B65C 9/46*** | (2006.01) |

(56) References Cited

U.S. PATENT DOCUMENTS

| | | | | |
|---|---|---|---|---|
| 10,706,239 | B1 * | 7/2020 | Tran | G06K 1/121 |
| 2010/0230054 | A1 * | 9/2010 | Sugawara | B65C 9/36<br>156/361 |
| 2015/0213606 | A1 * | 7/2015 | Akopyan | G06T 7/0004<br>348/46 |
| 2016/0052659 | A1 * | 2/2016 | Bowers | B65C 1/021<br>156/64 |
| 2018/0305061 | A1 * | 10/2018 | Vicktorius | B65C 9/36 |
| 2020/0071015 | A1 * | 3/2020 | Fan | B25J 15/0691 |
| 2021/0031961 | A1 * | 2/2021 | Fujita | B65C 1/021 |
| 2022/0097892 | A1 * | 3/2022 | Wen | B65C 9/44 |

FOREIGN PATENT DOCUMENTS

| | | | |
|---|---|---|---|
| JP | 2006131240 A | | 5/2006 |
| JP | 2014008767 A | * | 1/2014 |
| JP | 2019167155 A | | 10/2019 |
| JP | 2021179988 A | | 11/2021 |

OTHER PUBLICATIONS

Translation of JP-2014008767-A, JP-2014008767-A, Hishikawa T (Year: 2014).*

Notice of Rejection for Japanese Application No. 2022-128793, mailed Nov. 4, 2022, 14 pages with English translation.

Decision of Rejection for Japanese Application No. 2022-128793, mailed Dec. 22, 2022, 12 pages with English translation.

Decision to Grant for Japanese Application No. 2022-128793, mailed May 2023, 3 pages.

Panther Industries, Predator Printer Applicator with NEXTStep Applicator, https://www.youtube.com/watch?v=HEY83RANm7s&t=48s [last accessed May 1, 2024].

Cab Hermes+ with applicator 4014 and blow pad, cabProdukttechnik, https://www.youtube.com/watch?v=mzq7QKgfb1Q [last accessed May 1, 2024].

Hermes Q study: Labeling moving objects with the help of a robot, cabProdukttechnik, https://www.youtube.com/watch?v=gSSuChfl5Hc [last accessed May 1, 2024].

* cited by examiner

ROBOTIC SYSTEMS WITH MULTI-PURPOSE LABELING SYSTEMS AND METHODS

CROSS-REFERENCE TO RELATED APPLICATION(S)

The present application claims the benefit of U.S. Provisional Patent Application No. 63/232,665, filed Aug. 13, 2021, the entirety of which is incorporated herein by reference.

TECHNICAL FIELD

The present technology related generally to robotic systems with labeling systems, and more specifically labeling systems with automated positioning and placement mechanisms.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate, label, transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. Accordingly, there remains a need for improved techniques and systems for managing operations of and/or interactions between robots and objects.

Figure 1:
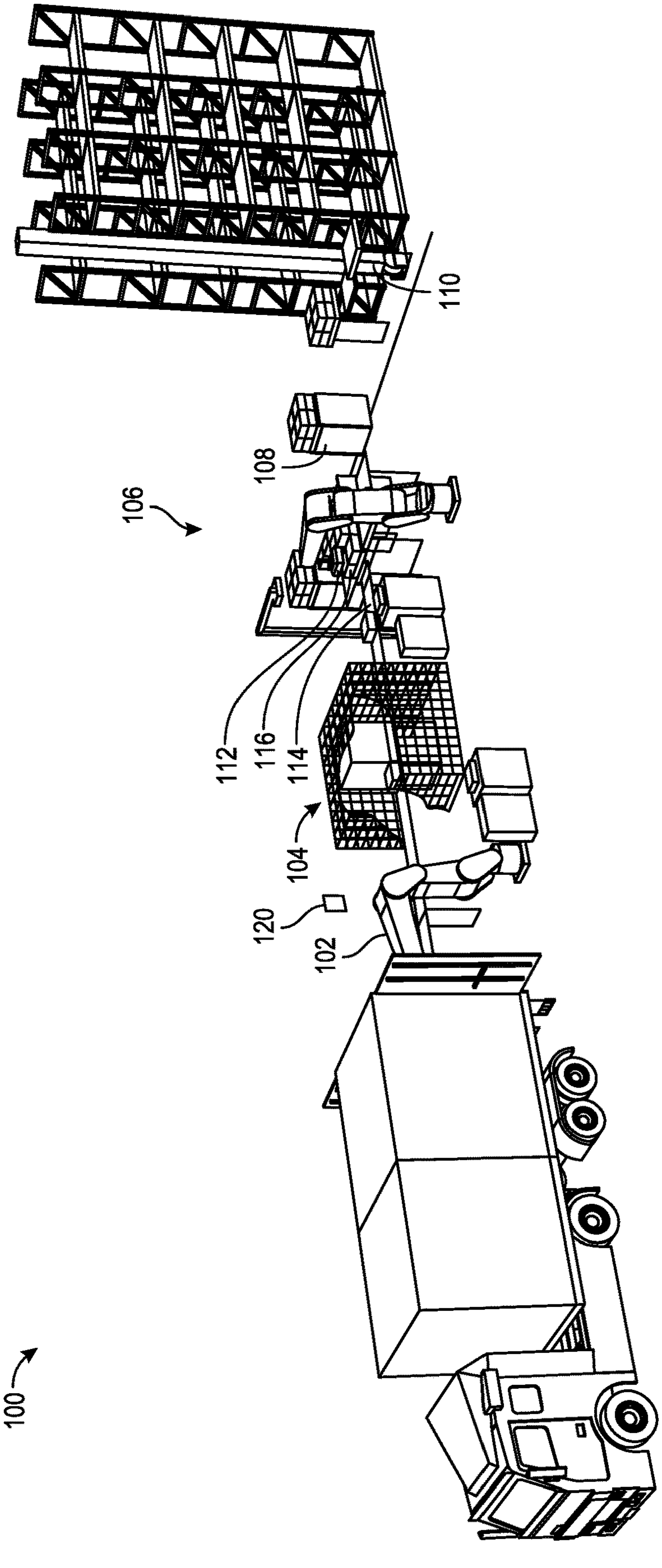
FIG. 1 is an illustration of an example environment in which a robotic system with a multi-purpose labeling mechanism can operate in accordance with some embodiments of the present technology.

The drawings have not necessarily been drawn to scale. Similarly, some components and/or operations can be separated into different blocks or combined into a single block for the purpose of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described.

For ease of reference, the multi-purpose labeling system and the components thereof are sometimes described herein with reference to top and bottom, upper and lower, upwards and downwards, a longitudinal plane, a horizontal plane, an x-y plane, a vertical plane, and/or a z-plane relative to the spatial orientation of the embodiments shown in the figures. It is to be understood, however, that the end effector and the components thereof can be moved to, and used in, different spatial orientations without changing the structure and/or function of the disclosed embodiments of the present technology.

DETAILED DESCRIPTION

Overview

Multi-purpose labeling systems and methods are disclosed herein. Such multi-purpose labeling systems can visually inspect objects in or interfacing with the robotic system to determine physical and identifying information about the objects. Based on the physical and identifying information, the labeling system can determine a target labeling location for placing a label on the object. The labeling system can also print and prepare a label for adhering to the object based on the physical and identifying information. The multi-purpose labeling systems can then automatically align a labeling module with the target labeling location and, using the labeling module, can place the label on the object at the target labeling location. By automatically identifying information about an object, generating a label for the object, and placing the label on the object, the labeling system can improve the ability for robotic systems to complete complex tasks without human interaction. Additionally, aspects of the multi-purpose labeling systems can provide further benefits including, for example: (i) reducing human involvement in object handling and management, (ii) increasing robotic system handling speeds, and/or (iii) eliminating the need to remove objects from the robotic system to place labels thereon, among other benefits.

In various embodiments of the multi-purpose labeling system, the labeling system can include a conveyor, a visual analysis module, and a labeling assembly. The conveyor can move an object in a first direction. The visual analysis module can include an optical sensor directed toward the conveyor, or a related location, to generate image data depicting the object. The labeling assembly can be spaced from the conveyor in a second direction and include a printer, a labeling module, and an alignment assembly. The printer can print a label based on the image data, and the labeling module can have a labeling plate for receiving the label. The alignment assembly can include a lateral-motion module, a vertical-motion module, and a rotary module for moving the labeling module along or about the first, the second, and a third direction, and can place the labeling plate adjacent to an object surface. In some embodiments, the labeling system can include one or more controllers having a computer-readable medium carrying instructions to operate the visual analysis module, the printer, the labeling module, and the alignment assembly.

Embodiments of the labeling system can place the label on the object by optically scanning the object on the conveyor for visual features and physical features. The visual features can include available labeling space and an object identifier reading. The physical features can include dimensions of the object. From the available labeling space, the labeling system can identify a target labeling location. From the object identifier reading, the labeling system can prepare the label on the labeling module carried by the alignment assembly. The labeling system can then align the labeling module with the target labeling location using the conveyor and the alignment assembly, based on the physical features, and can apply the label to the object using the alignment assembly.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer-executable or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include internet appliances and/or application or handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, and/or that the two or more elements co-operate or interact with each other (e.g., as in a cause-and-effect relationship, such as for signal transmission/reception or for function calls).

Example Environment for Robotic System

FIG. 1 is an illustration of an example environment in which a robotic system 100 with a multi-purpose labeling system 104 can operate. The operating environment for the robotic system 100 can include one or more structures, such as robots or robotic devices, configured to execute one or more tasks. Aspects of the multi-purpose labeling system 104 can be practiced or implemented by the various structures and/or components.

In the example illustrated in FIG. 1, the robotic system 100 can include an unloading unit 102, the multi-purpose labeling system 104, a transfer unit 106, a transport unit 108, a loading unit 110, or a combination thereof in a warehouse, a distribution center, or a shipping hub. Each of the units in the robotic system 100 can be configured to execute one or more tasks. The tasks can be combined in sequence to perform an operation that achieves a goal, for example, such as (i) to unload objects from a vehicle (via, e.g., the unloading unit 102), such as a truck, trailer, a van, or train car; (ii) to label the objects (via, e.g., the multi-purpose labeling system 104); (iii) to transfer and/or transport the objects from one system to another (via, e.g., the transfer unit 106, the transport unit 108); and/or (iv) to store the objects in a warehouse or to unload objects from storage locations (via, e.g., the loading unit 110). Additionally or alternatively, the operations can be performed to achieve a different goal, for example, to load the objects onto a vehicle for shipping. In another example, the task can include moving objects from one location, such as a container, bin, cage, basket, shelf, platform, pallet, or conveyor belt, to another location. Each of the units can be configured to execute a sequence of actions, such as operating one or more components therein, to execute a task.

In some embodiments, the task can include interaction with a target object 112, such as manipulation, moving, reorienting, labeling, or a combination thereof, of the object. The target object 112 is the object that will be handled by the robotic system 100. More specifically, the target object 112 can be the specific object among many objects that is the target of an operation or task by the robotic system 100. For example, the target object 112 can be the object that the robotic system 100 has selected for or is currently being handled, manipulated, moved, reoriented, labeled, or a combination thereof. The target object 112, as examples, can include boxes, cases, tubes, packages, bundles, an assortment of individual items, or any other object that can be handled by the robotic system 100.

As an example, the task can include transferring the target object 112 from an object source 114 to a task location 116. The object source 114 is a receptacle for storage of objects. The object source 114 can include numerous configurations and forms. For example, the object source 114 can be a platform, with or without walls, on which objects can be placed or stacked, such as a pallet, a shelf, or a conveyor belt. As another, the object source 114 can be a partially or fully enclosed receptacle with walls or lid in which objects can be placed, such as a bin, cage, or basket. In some embodiments, the walls of the object source 114 with the partially or fully enclosed can be transparent or can include openings or gaps of various sizes such that portions of the objects contained therein can be visible or partially visible through the walls.

FIG. 1 illustrates examples of the possible functions and operations that can be performed by the various units of the robotic system 100 in handling the target object 112 and it is understood that the environment and conditions can differ from those described hereinafter. For example, the unloading unit 102 can be a vehicle offloading robot configured to transfer the target object 112 from a location in a carrier, such as a truck, to a location on a conveyor belt. Once on the conveyor belt, the target object 112 can be labeled by the multi-purpose labeling system 104 for identification purposes internal or external to the robotic system, such as identifying contents of the target object 112, providing a shipping label, or other similar purposes. Details regarding the multi-purpose labeling system 104 are described below. The transfer unit 106, such as a palletizing robot, can be configured to transfer the labeled target object 112 from a location on the conveyor belt to a location on the transport unit 108, such as for loading the target object 112 on a pallet on the transport unit 108. In another example, the transfer unit 106 can be a piece-picking robot configured to transfer the target object 112 from one container to another container. In completing the operation, the transport unit 108 can transfer the target object 112 from an area associated with the transfer unit 106 to an area associated with the loading unit 110, and the loading unit 110 can transfer the target object 112, such as by moving the pallet carrying the target object 112, from the transfer unit 106 to a storage location, such as a location on the shelves.

For illustrative purposes, the robotic system 100 is described in the context of a shipping center; however, it is understood that the robotic system 100 can be configured to execute tasks in other environments or for other purposes, such as for manufacturing, assembly, packaging, healthcare, or other types of automation. It is also understood that the robotic system 100 can include other units, such as manipulators, service robots, modular robots, that are not shown in FIG. 1. For example, in some embodiments, the robotic system 100 can include a depalletizing unit for transferring the objects from cages, carts, or pallets onto conveyors or other pallets, a container-switching unit for transferring the objects from one container to another, a packaging unit for wrapping the objects, a sorting unit for grouping objects according to one or more characteristics thereof, a piece-picking unit for manipulating the objects differently, such as sorting, grouping, and/or transferring, according to one or more characteristics thereof, or a combination thereof.

The robotic system 100 can include a controller 120 configured to interface with and/or control one or more of the robotic units. For example, the controller 120 can include circuits (e.g., one or more processors, memory, etc.) configured to derive motion plans and/or corresponding commands, settings, and the like used to operate the corresponding robotic unit. The controller 120 can communicate the motion plans, the commands, settings, etc. to the robotic unit, and the robotic unit can execute the communicated plan to accomplish a corresponding task, such as to transfer the target object 112 from the object source 114 to the task location 116.

Suitable System

Figure 2:
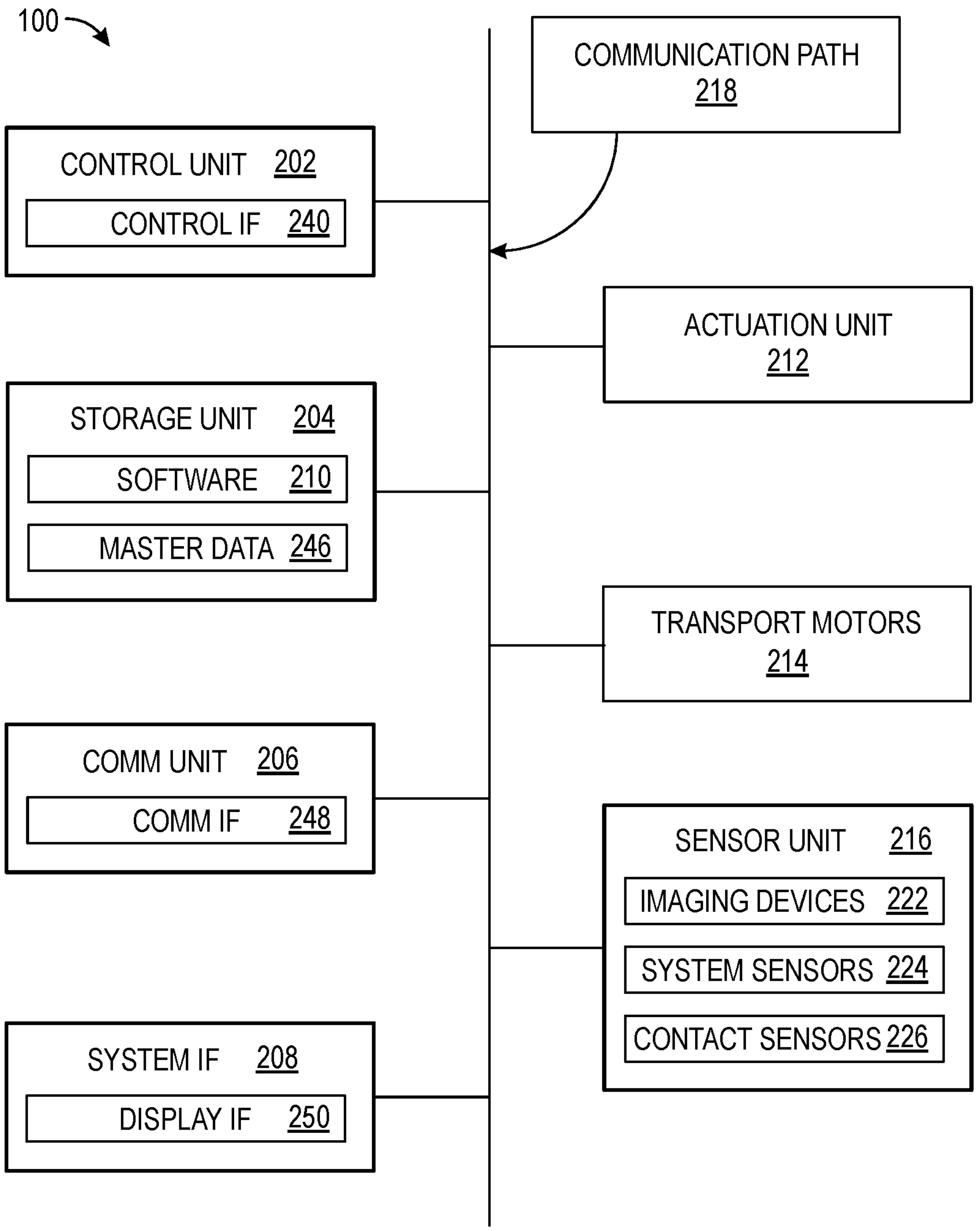
FIG. 2 is a block diagram illustrating the robotic system of FIG. 1 in accordance with some embodiments of the present technology.

FIG. 2 is a block diagram illustrating the robotic system 100 in accordance with one or more embodiments of the present technology. In some embodiments, for example, the robotic system 100 can include electronic devices, electrical devices, or a combination thereof, such as a control unit 202 (sometimes also referred to herein as a "processor 202"), a storage unit 204, a communication unit 206, a system input/output ("I/O") device 208 having a system interface (sometimes also referred to herein as a "user interface," or a system or user "IF"), one or more actuation devices 212, one or more transport motors 214, one or more sensor units 216, or a combination thereof that are coupled to one another, integrated with or coupled to one or more of the units or robots described in FIG. 1 above, or a combination thereof.

The control unit 202 can be implemented in a number of different ways. For example, the control unit 202 can be a processor, an application specific integrated circuit ("ASIC"), an embedded processor, a microprocessor, a hardware control logic, a hardware finite state machine ("FSM"), a digital signal processor ("DSP"), or a combination thereof. The control unit 202 can execute software 210 and/or instructions to provide the intelligence of the robotic system 100.

The control unit 202 can be operably coupled to the I/O device 208 to provide a user with control over the control unit 202. The I/O device 208 can be used for communication between the user and the control unit 202 and other functional units in the robotic system 100. The I/O device 208 can also be used for communication that is external to the robotic system 100. The I/O device 208 can receive information from the other functional units or from external sources, and/or can transmit information to the other functional units or to external destinations. The external sources and the external destinations refer to sources and destinations external to the robotic system 100.

The I/O device 208 can be implemented in different ways and can include different implementations depending on which functional units or external units are being interfaced with the I/O device 208. For example, the I/O device 208 can be implemented with a pressure sensor, an inertial sensor, a microelectromechanical system ("MEMS"), optical circuitry, waveguides, wireless circuitry, wireline circuitry, application programming interface, or a combination thereof.

The storage unit 204 can store the software instructions 210, master data 246, tracking data, or a combination thereof. For illustrative purposes, the storage unit 204 is shown as a single element, although it is understood that the storage unit 204 can be a distribution of storage elements. Also for illustrative purposes, the robotic system 100 is shown with the storage unit 204 as a single hierarchy storage system, although it is understood that the robotic system 100 can have the storage unit 204 in a different configuration. For example, the storage unit 204 can be formed with different storage technologies forming a memory hierarchal system including different levels of caching, main memory, rotating media, and/or off-line storage.

The storage unit 204 can be a volatile memory, a non-volatile memory, an internal memory, an external memory, or a combination thereof. For example, the storage unit 204 can be a nonvolatile storage such as non-volatile random access memory ("NVRAM"), Flash memory, disk storage, and/or a volatile storage such as static random access memory ("SRAM"). As a further example, storage unit 204 can be a non-transitory computer medium including the non-volatile memory, such as a hard disk drive, NVRAM, solid-state storage device ("SSD"), compact disk ("CD"), digital video disk ("DVD"), and/or universal serial bus ("USB") flash memory devices. The software 210 can be stored on the non-transitory computer readable medium to be executed by a control unit 202.

In some embodiments, the storage unit 204 is used to further store and/or provide access to processing results, predetermined data, thresholds, or a combination thereof. For example, the storage unit 204 can store master data 246 that includes descriptions of the one or more target objects 112 (e.g., boxes, box types, cases, case types, products, or a combination thereof). In one embodiment, the master data 246 includes dimensions, predetermined shapes, templates for potential poses and/or computer-generated models for recognizing different poses, a color scheme, an image, identification information (e.g., bar codes, quick response (QR) codes, logos, and the like), expected locations, an expected weight, or a combination thereof, for the one or more target objects 112 expected to be manipulated by the robotic system 100.

In some embodiments, the master data 246 includes manipulation-related information regarding the one or more objects that can be encountered or handled by the robotic system 100. For example, the manipulation-related information for the objects can include a center-of-mass location on each of the objects, expected sensor measurements (e.g., for force, torque, pressure, and/or contact measurements), corresponding to one or more actions, maneuvers, or a combination thereof.

The communication unit 206 can enable external communication to and from the robotic system 100. For example, the communication unit 206 can enable the robotic system 100 to communicate with other robotic systems and/or units, external devices, such as an external computer, an external database, an external machine, an external peripheral device, or a combination thereof, through a communication path 218, such as a wired or wireless network.

The communication path 218 can span and represent a variety of networks and/or network topologies. For example, the communication path 218 can include wireless communication, wired communication, optical communication, ultrasonic communication, or the combination thereof. For example, satellite communication, cellular communication, Bluetooth, Infrared Data Association standard ("lrDA"), wireless fidelity ("WiFi"), and/or worldwide interoperability for microwave access ("WiMAX") are examples of wireless communication that can be included in the communication path 218. Cable, Ethernet, digital subscriber line ("DSL"), fiber optic lines, fiber to the home ("FTTH"), and/or plain old telephone service ("POTS") are examples of wired communication that can be included in the communication path 218. Further, the communication path 218 can traverse a number of network topologies and distances. For example, the communication path 218 can include direct connection, personal area network ("PAN"), local area network ("LAN"), metropolitan area network ("MAN"), wide area network ("WAN"), or a combination thereof. The robotic system 100 can transmit information between the various units through the communication path 218. For example, the information can be transmitted between the control unit 202, the storage unit 204, the communication unit 206, the I/O device 208, the actuation devices 212, the transport motors 214, the sensor units 216, or a combination thereof.

The communication unit 206 can also function as a communication hub allowing the robotic system 100 to function as part of the communication path 218 and not limited to be an end point or terminal unit to the communication path 218. The communication unit 206 can include active and/or passive components, such as microelectronics or an antenna, for interaction with the communication path 218.

The communication unit 206 can include a communication interface 248. The communication interface 248 can be used for communication between the communication unit 206 and other functional units in the robotic system 100. The communication interface 248 can receive information from the other functional units and/or from external sources, and/or can transmit information to the other functional units and/or to external destinations. The external sources and the external destinations refer to sources and destinations external to the robotic system 100.

The communication interface 248 can include different implementations depending on which functional units are being interfaced with the communication unit 206. The communication interface 248 can be implemented with technologies and techniques similar to the implementation of the control interface 240.

The I/O device 208 can include one or more input sub-devices and/or one or more output sub-devices. Examples of the input devices of the I/O device 208 can include a keypad, a touchpad, soft-keys, a keyboard, a microphone, sensors for receiving remote signals, a camera for receiving motion commands, or a combination thereof, to provide data and/or communication inputs. Examples of the output device can include a display interface. The display interface can be any graphical user interface such as a display, a projector, a video screen, and/or a combination thereof.

The control unit 202 can operate the I/O device 208 to present or receive information generated by the robotic system 100. The control unit 202 can operate the I/O device 208 to present information generated by the robotic system 100. The control unit 202 can also execute the software 210 and/or instructions for the other functions of the robotic system 100. The control unit 202 can further execute the software 210 and/or instructions for interaction with the communication path 218 via the communication unit 206.

The robotic system 100 can include physical and/or structural members, such as robotic manipulator arms, that are connected at joints for motion, such as rotational displacement, translational displacements, or a combination thereof. The structural members and the joints can form a kinetic chain configured to manipulate an end-effector, such as a gripping element, to execute one or more task, such as gripping, spinning, welding, and/or labeling, depending on the use or operation of the robotic system 100. The robotic system 100 can include the actuation devices 212, such as motors, actuators, wires, artificial muscles, electroactive polymers, or a combination thereof, configured to drive, manipulate, displace, reorient, label, or a combination thereof, the structural members about or at a corresponding joint. In some embodiments, the robotic system 100 can include the transport motors 214 configured to transport the corresponding units from place to place.

The robotic system 100 can include the sensor units 216 configured to obtain information used to execute tasks and operations, such as for manipulating the structural members or for transporting the robotic units. The sensor units 216 can include devices configured to detect and/or measure one or more physical properties of the robotic system 100, such as a state, a condition, a location of one or more structural members or joints, information about objects and/or surrounding environment, or a combination thereof. As an example, the sensor units 216 can include imaging devices, system sensors, contact sensors, and/or a combination thereof.

In some embodiments, the sensor units 216 include one or more imaging devices 222. The imaging devices 222 can be configured to detect and image the surrounding environment. For example, the imaging devices 222 can include 2-dimensional cameras ("2D"), 3-dimensional cameras ("3D"), both of which can include a combination of visual and infrared capabilities, lidars, radars, other distance-measuring devices, and/or other imaging devices. The imaging devices 222 can generate a representation of the detected environment, such as a digital image and/or a point cloud, used for implementing machine/computer vision for automatic inspection, object measurement, robot guidance, and/or other robotic applications. As described in further detail below, the robotic system 100 can process the digital image, the point cloud, or a combination thereof via the control unit 202 to identify the target object 112 of FIG. 1, a pose of the target object 112, a size and/or orientation of the target object 112, or a combination thereof. For manipulating the target object 112, the robotic system 100 can capture and analyze an image of a designated area, such as inside the truck, inside the container, or a location for objects on the conveyor belt, to identify the target object 112 and physical properties thereof, and the object source 114 of FIG. 1. Similarly, the robotic system 100 can capture and analyze an image of another designated area, such as a drop location for placing or labeling objects on the conveyor belt, a location for placing objects inside the container, or a location on the pallet for stacking purposes, to identify the task location 116 of FIG. 1.

In some embodiments, the sensor units 216 can include system sensors 224. The system sensors 224 can monitor the robotic units within the robotic system 100. For example, the system sensors 224 can include units and/or devices to detect and/or monitor positions of structural members, such as the robotic arms, the end-effectors, corresponding joints of robotic units, or a combination thereof. As a further example, the robotic system 100 can use the system sensors 224 to track locations, orientations, or a combination thereof, of the structural members and/or the joints during execution of the task. Examples of the system sensors 224 can include accelerometers, gyroscopes, position encoders, and/or other similar sensors.

In some embodiments, the sensor units 216 can include the contact sensors 226, such as pressure sensors, force sensors, strain gauges, piezoresistive/piezoelectric sensors, capacitive sensors, elastoresistive sensors, torque sensors, linear force sensors, other tactile sensors, and/or any other suitable sensors configured to measure a characteristic associated with a direct contact between multiple physical structures and/or surfaces. For example, the contact sensors 226 can measure the characteristic that corresponds to a grip of the end-effector on the target object 112 or measure the weight of the target object 112. Accordingly, the contact sensors 226 can output a contact measure that represents a quantified measure, such as a measured force or torque, corresponding to a degree of contact and/or attachment between the gripping element and the target object 112. For example, the contact measure can include one or more force or torque readings associated with forces applied to the target object 112 by the end-effector.

Suitable Multi-Purpose Labeling Systems and Related Components

Figure 3:
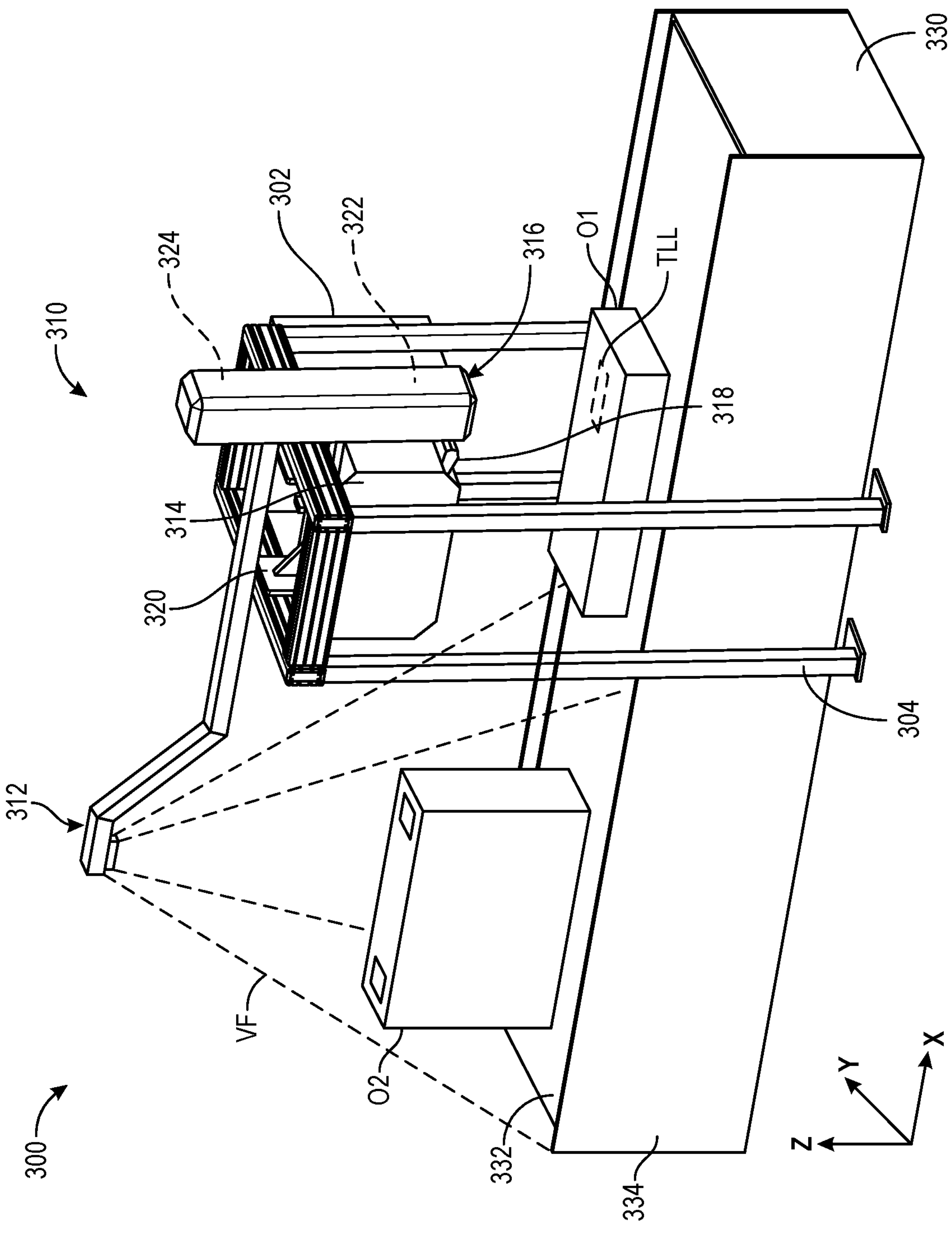
FIG. 3 is a front perspective view of a first example multi-purpose labeling system, configured in accordance with some embodiments of the present technology.

FIG. 3 is a front perspective view of a first example multi-purpose labeling system 300 (e.g., an example of the multi-purpose labeling system 104 of FIG. 1) that can visually inspect an object (e.g., O1, O2) and place a label thereon, configured in accordance with some embodiments of the present technology. More specifically, the labeling system 300, in some embodiments, can visually inspect an object on a conveyor assembly 330; identify information regarding the object, such as physical characteristics (e.g., exterior dimensions, unobstructed surface areas) and/or identification information (e.g., one or more object and/or object contents identifiers); determine (e.g., derive, compute) a target location (e.g., placement location) for labeling the object; align a labeling module 316 with the target labeling location (e.g., TLL); and prepare and adhere a label to the object at the target labeling location. Aspects of the labeling system 300 can efficiently (e.g., more quickly, requiring less motion) and/or automatically (e.g., not requiring human input) prepare and adhere labels to objects within a robotic system (e.g., the robotic system 100 of FIG. 1) while avoiding preexisting labels and/or images on the objects as they progress through the robotic system. By providing automatic labeling, the labeling system 300 can improve object tracking and/or management without (i) requiring human involvement, (ii) slowing operation of the robotic system, and/or (iii) removing the objects from the robotic system, among other benefits. Further, the labeling system 300 provides benefits over alternative labeling systems by including alignment (e.g., motion) modules traveling along or about dedicated axes, improving efficiency, robustness, and/or accuracy, and increasing overall system throughput as compared to free-moving and six degrees of freedom robotics.

For ease of reference, FIG. 3 includes an XYZ reference frame corresponding to the labeling system 300 as illustrated. The x-axis and y-axis are parallel to a ground surface underneath the labeling system 300. The x-axis is along a length of the labeling system 300 (e.g., along a length of the conveyor assembly 330) and the y-axis is perpendicular thereto. The z-axis is perpendicular to the ground surface (e.g., along a height of the labeling system 300). Unless stated otherwise, reference frames included in subsequent figures are aligned with the reference frame of FIG. 3.

As illustrated in FIG. 3, the labeling system 300 can include a controls cabinet 302 with equipment (e.g., one or more of the processors or the control unit 202 of FIG. 2) therein for managing operations of the labeling system 300, the conveyor assembly 330, and/or the labeling assembly 310 for visually inspecting and adhering labels to objects on the conveyor assembly 330. One or both of the controls cabinet 302 and the labeling assembly 310 can be carried by a labeling assembly frame 304. The assembly frame 304 can be coupled to or resting on the ground surface. In some embodiments, the assembly frame 304 can be coupled to, and moveable with, the conveyor assembly 330 (e.g., when the conveyor assembly 330 can telescope, tilt, rotate, and/or otherwise move relative to the ground surface).

The conveyor assembly 330 can include a conveyor 332 carried by a conveyor support 334 (e.g., housing, struts). The conveyor 332 can move objects from a first end of the conveyor assembly 330 to a second end of the conveyor assembly 330 (e.g., along a first direction), as well as hold (e.g., stop, move slowly) objects along the length of the conveyor assembly 330 (e.g., under portions of the labeling assembly 310). The conveyor 332 can include one or more linear and/or non-linear motorized belt, rollers, multi-direction rollers, wheels, and/or any suitable mechanisms that can operate to selectably moving and/or holding the objects thereon. As illustrated, the conveyor assembly 330 includes a single conveyor 332. In some embodiments, the conveyor assembly 330 can include one or more additional conveyors 332 in sequence for independent movement of and/or holding objects thereon. Further, in some embodiments, the labeling system 300 can include one or more conveyor assemblies 330 with one or more conveyors 332.

The labeling assembly 310 can include: (i) a visual analysis module 312 for visually inspecting the objects, (ii) a printing module 314 for printing labels, (iii) the labeling module 316 for receiving printed labels and for adhering labels to the objects, and (iv) a labeling alignment assembly for aligning the labeling module 316 with the target labeling location of each object. In some embodiments, the labeling assembly 310 can further include a label flipping module 318 for preparing (by, e.g., folding, flipping, and/or pealing) printed labels for the labeling module 316. The labeling alignment assembly can include, for example, a lateral-motion module 320 operable along the y-axis, a vertical-motion module 322 operable along the z-axis, and/or a rotary module 324 operable about the z-axis, each configured to move the labeling module 316 along and/or about the respective identified axes. As illustrated in FIG. 3, the vertical-motion module 322 and the rotary module 324 are obscured from view by a protective cover.

Objects can first interface with the labeling assembly 310 at the visual analysis module 312. The visual analysis module 312 can collect object information (e.g., collected and/or derived from one or more of an object reading, image data, etc.) for the labeling system 300 to identify the object and/or a target labeling locations thereon. The visual analysis module 312 can also collect information for aligning the labeling module 316 with the target labeling location. The target labeling location can be a portion of one or more surfaces of the object that satisfies one or more predetermined conditions for adhering a label. For example, the target labeling location can be separate from (e.g., non-overlapping) one or more existing labels, images, logos, object surface damages, and/or other similar items to be left uncovered in placing a label. Additionally or alternatively, the target labeling location can be associated with a known and/or preferred location. For example, the known location can be based on industry standard, future handling of the object, customer-specification, and/or other similar circumstances where certain labeling locations facilitate more efficient object label reading and/or object handling, such as for packing and/or gripping. Further, in some embodiments, the target labeling location can be a set location for certain objects, regardless of items on a surface of the object.

The visual analysis module 312 can be coupled to the assembly frame 304 and positioned above the conveyor assembly 330 to analyze the object before reaching the labeling assembly 310. The visual analysis module 312 can include one or more imaging and/or optical sensor devices (e.g., the imaging devices 222 of FIG. 2) having a vision field (e.g., VF) directed toward the conveyor assembly 330, or a related location, for analyzing objects (e.g., generating image data depicting and/or optically scanning the object). For example, the visual analysis module 312 can include: (i) one or more 3D cameras for scanning an exterior surface of the object using one or more visual, infrared, lidar, radar, and/or other distance-measuring features; (ii) one or more 2D cameras for identifying images, label and/or labeling, identifiers, and/or other contents on a surface of the object; and/or (iii) one or more scanners for reading identifiers (e.g., barcode, QR, RFID, or similar codes) on the object.

Object information, collected by the 2D and 3D cameras can include physical characteristics of the object. For example, the 2D and 3D cameras can both collect the size of a surface (e.g., top, one or more sides) of the object, a rotational orientation (e.g., about the z-axis) and/or location of the object (e.g., along the y-axis) (individually or collectively, an object pose) relative to the conveyor assembly 330 and/or the labeling assembly 310. The 3D cameras can further collect a height, a width, and/or a length of the object, in addition to other exterior dimensions thereof when the object is non-rectangular or non-square. The 2D cameras can further collect images identifying a texture (e.g., the visual characteristics) of one or more surfaces of the object. For example, the 2D camera can identify images and/or labels and the contents thereof (e.g., image codes, wording, symbols), damage, and/or blank spaces on the top surface using image recognition, optical character recognition ("OCR"), color-based comparison, object-based comparison, text-based comparison, and/or other similar image analysis methods.

Object information collected by the scanners can include identifying information (e.g., an object identifier reading), such as an object and/or object contents identifier (e.g., shipping number, object identifier, contents identifier, part number, etc.). In some embodiments, identifying information can be derived from physical characteristics. For example, the labeling system 300 can use the visual analysis module 312, the controller in the controls cabinet 302, and/or one or more devices external to the labeling assembly 310 to analyze the object information/image data for identifying the target labeling location. In analyzing the object information, the labeling system 300 can derive or detect one or more identifiable information, such as the physical dimensions, object identifiers, visual/textural patterns, or the like depicted in the image data. The labeling system 300 can compare the identifiable information to the master data 246 of FIG. 2 to detect or recognize the imaged object. The labeling system 300 can further use the registration information in the master data 246 and/or analyze the image data to identify the target labeling location. The labeling system 300 can derive the target labeling location as an area having minimum required dimensions, having uniform texture, and/or being absent any recognizable patterns (e.g., barcode, QR code, letters or design markers, and the like).

The printing module 314 can use the object information to print a label for adhering to the analyzed object. The printing module 314 can include a housing coupled to the assembly frame 304 with a printer therein. As illustrated in FIG. 3, the housing is coupled to the assembly frame 304 via the lateral-motion module 320. In some embodiments, the housing can instead be directly connected to the assembly frame 304. The printer can prepare and dispense labels from the printing module 314 to the labeling module 316, and/or to the label flipping module 318. The printer can print labels having one or more shapes and sizes, and one or more backing and printing colors. Further, the printer can print labels having text, images, symbols, and/or any other similar information thereon.

For example, the printing module 314 can print rectangular and/or square labels as small as, or smaller than, 1.0 in×1.0 in (2.5 cm×2.5 cm) or as large as, or greater than, 4.0 in×6.0 in (10.2 cm×15.2 cm). Further, the printed labels can have, for example, white backing and black lettering; black backing, white lettering, and red symbols; red backing and a yellow image; or any other combination of backing and printing colors and contents. In some embodiments, the printing module 314 can print non-rectangular and/or non-square labels, such as triangles, circles, ovals, and/or any other shape. Further, the printing module 314 can print labels having an adhesive on one or more portions thereof. For example, labels requiring flipping, folding, and/or peeling (e.g., a protective covering over the adhesive) before adhesion to the object can include an adhesive covering a first side (e.g., a side facing the conveyor assembly 330), and an adhesive covering at least a portion of a second side (e.g., a side facing away from the conveyor assembly 330).

When the object is visually analyzed, the labeling assembly 310 can print and transfer the label to the labeling module 316. Then, the labeling alignment assembly and the conveyor 332 (together, the "alignment elements") can engage to align the labeling module 316 with the target labeling location. For example, (i) the conveyor 332 can advance the object to align the labeling module 316 with the target labeling location along the x-axis (e.g., along the first direction), (ii) the lateral-motion module 320 can move the labeling module 316 to align with the target labeling location along the y-axis (e.g., along a second direction), and (iii) the rotary module 324 can rotate the labeling module 316 to align with the target labeling location about the z-axis. Once aligned along the x-axis and the y-axis, and aligned about the z-axis, the vertical-motion module 322 can move the labeling module 316 along the z-axis (e.g., along a third direction) to place the labeling module 316 against the top surface of the object, adhering the label thereto.

In some embodiments, one or more of the alignment elements and/or the printing module 314 can operate in unison and/or in sequence to align the target labeling location with the labeling module 316. For example, while and/or after an object is visually analyzed and the target labeling location is identified, the printing module 314 can print the label, the conveyor 332 can engage to advance the object along the x-axis, and/or the lateral-motion module 320 can engage to move the labeling module 316 along the y-axis. The vertical-motion module 322 and the rotary module 324 can then engage to move the labeling module 316 along and about the z-axis, respectively, and place the label on the object. In some embodiments, the vertical-motion module 322 and/or the rotary module 324 can engage before, at the same time as, or after the conveyor 332 and the lateral-motion module 320. Further, the vertical-motion module 322 and/or the rotary module 324 can engage as or just after (e.g., 0.5 sec, 1 sec, 5 sec, etc.) the labeling module 316 is aligned with the target labeling location along the x, y, and/or z-axes, and/or about the z-axis. Once the label is placed on the object, the labeling module 316 can be retracted by the alignment assembly and prepared to place a label on a subsequent object (e.g., 02). For example, while the labeling module 316 is aligned with the target labeling location of the object (e.g., 01) and/or while the label is placed on the object (e.g., 01), the visual analysis module 312 can visually analyze the subsequent object.

Figure 4:
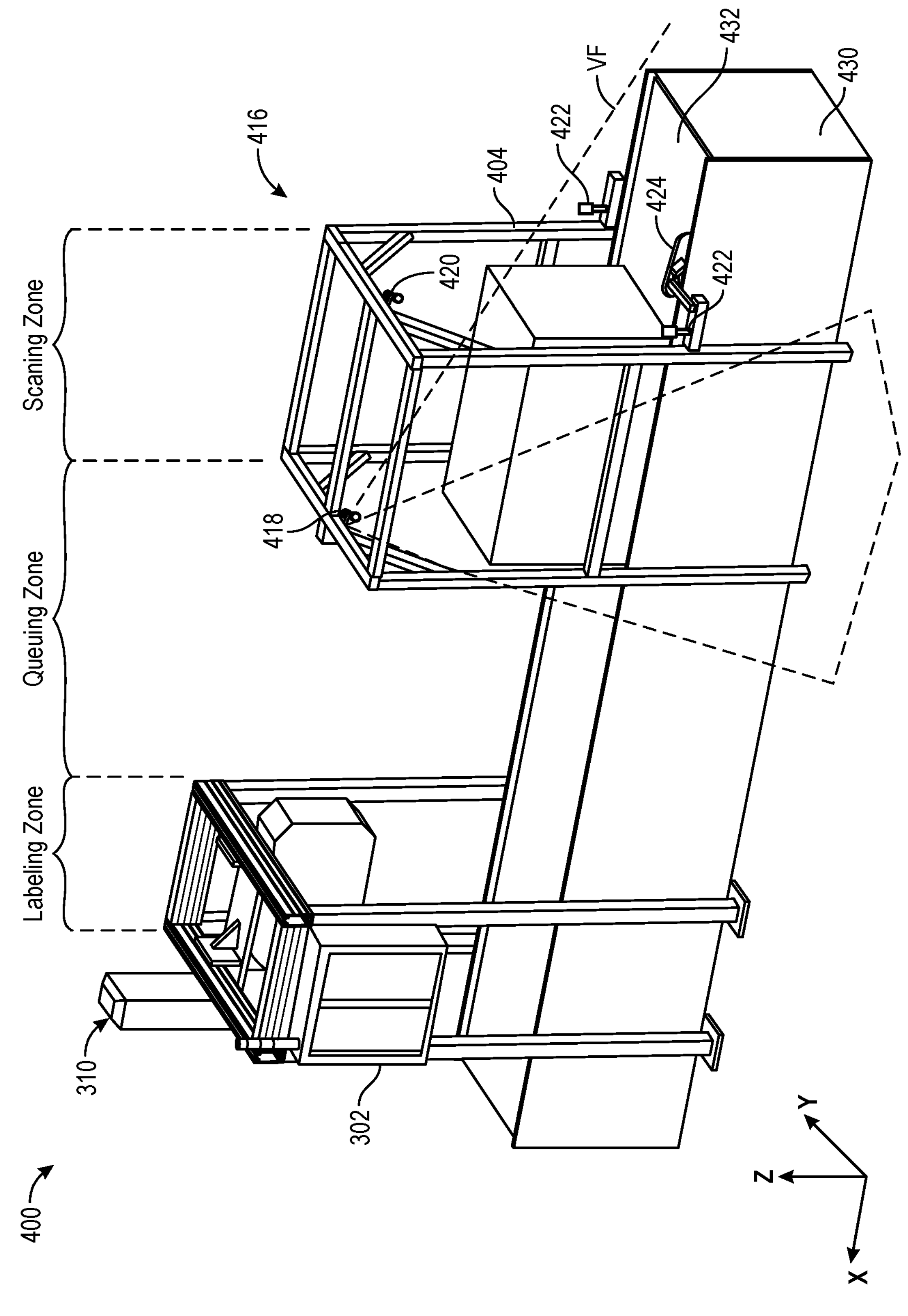
FIG. 4 is a back perspective view of a second example multi-purpose labeling system, configured in accordance with some embodiments of the present technology.

FIG. 4 is a rear perspective view of a second example multi-purpose labeling system 400 (e.g., an example of the multi-purpose labeling system 104 of FIG. 1) that, like labeling system 300 of FIG. 3, can visually inspect an object for placing a label thereon, configured in accordance with some embodiments of the present technology. The labeling system 400 of FIG. 4 can include one or more or all of the same and/or similar elements performing the corresponding operations as the labeling system 300 of FIG. 3. Portions of the labeling system 400 of FIG. 4 can correspond with a set of (e.g., three) zones associated with portions of a conveyor assembly 430 for managing visual analysis and labeling of objects. Additionally, instead of the visual analysis module 312 coupled to the labeling assembly 310 of FIG. 3, the labeling system 400 of FIG. 4 can include a visual analysis unit 416 physically separated from the labeling assembly 310.

The three zones of the labeling system 400 of FIG. 4 can include a scanning zone, a queuing zone, and a labeling zone corresponding with stages of object processing. An object can enter the scanning zone on a first portion of a conveyor 432 of the conveyor assembly 430, where the visual analysis unit 416 can identify information regarding the object (e.g., object information) in preparation for locating the target labeling location. The object can then move to the queuing zone on a second portion of the conveyor 432, where one or more objects may be held, such as while the target labeling location for each object is identified and/or while the labeling assembly 310 prepares the label for a next object. Finally, the object can move to the labeling zone on a third portion of the conveyor 432, where the labeling assembly 310 and the third portion of the conveyor 432 can align the labeling module 316 with the target labeling location, and the labeling module 316 of FIG. 3 can adhere the label to the object.

Like the conveyor assembly 330 of FIG. 3, in some embodiments, the conveyor assembly 430 of FIG. 4 can include one or more conveyor assemblies 430 with one or more conveyors 432. For example, the first, second, and/or third portions of the conveyor 432 can correspond with segments of a single conveyor 432 (e.g., conveyor belt) of a single conveyor assembly 430. Alternatively, as a further example, the labeling system 400 can include a single conveyor assembly 430 with three conveyors 432, each corresponding with the first, second, or third portion; or the labeling system 400 can include three conveyor assemblies 430, each corresponding with the first, second, or third portion and having a single conveyor 432.

The visual analysis unit 416 can be carried by a visual analysis unit frame 404. The visual analysis unit frame 404 can be coupled to or resting on the ground surface. In some embodiments, the visual analysis unit frame 404 can be coupled to the conveyor assembly 430 and moveable therewith. The visual analysis unit 416 can collect object information for the labeling system 400 to identify the object and/or the target labeling location thereon, as well as collect information for aligning the labeling module 316 with the target labeling location. The visual analysis unit 416 can include one or more imaging devices and/or sensors (e.g., the imaging devices 222 of FIG. 2) directed toward the conveyor assembly 430 or a related location. For example, the visual analysis unit 416 can include: (i) one or more 3D cameras, (ii) one or more 2D cameras, (iii) one or more scanners, and/or (iv) one or more sensors for tracking information regarding the conveyor assembly 430 and/or objects thereon.

The one or more 3D cameras, one or more 2D cameras, and one or more scanners can be coupled to any portion of the visual analysis unit frame 404 and positioned to analyze any one or more surfaces of the object. For example, a 3D camera 418 can be positioned on a top, front or back portion of the visual analysis unit frame 404 (e.g., top of the frame 404 toward or away from the labeling assembly 310, respectively) facing a front of the object to collect a height, width, and length of the object within a vision field (e.g., VF) for labeling alignment and placement. One or more 2D cameras 420 can be coupled to the top and/or one or more sides of the visual analysis unit frame 404 to collect images of the top and/or one or more sides of the object to identify the target labeling location. Scanners 422 can be coupled to the top and/or one or more sides of the visual analysis unit frame 404 to collect identifying information from the object. Similarly, one or more sensor 424 can be coupled to the top and/or one or more sides of the visual analysis unit frame 404 for tracking information regarding the conveyor assembly 430 and/or objects thereon. For example, the sensor 424 can include one or more encoders, switches, force sensors, level sensors, proximeters, IR beam sensors, light curtains, and/or any similar sensor for tracking operation of the conveyor 432, identifying information regarding the object thereon, and/or a location and/or pose of an object thereon.

Figure 5:
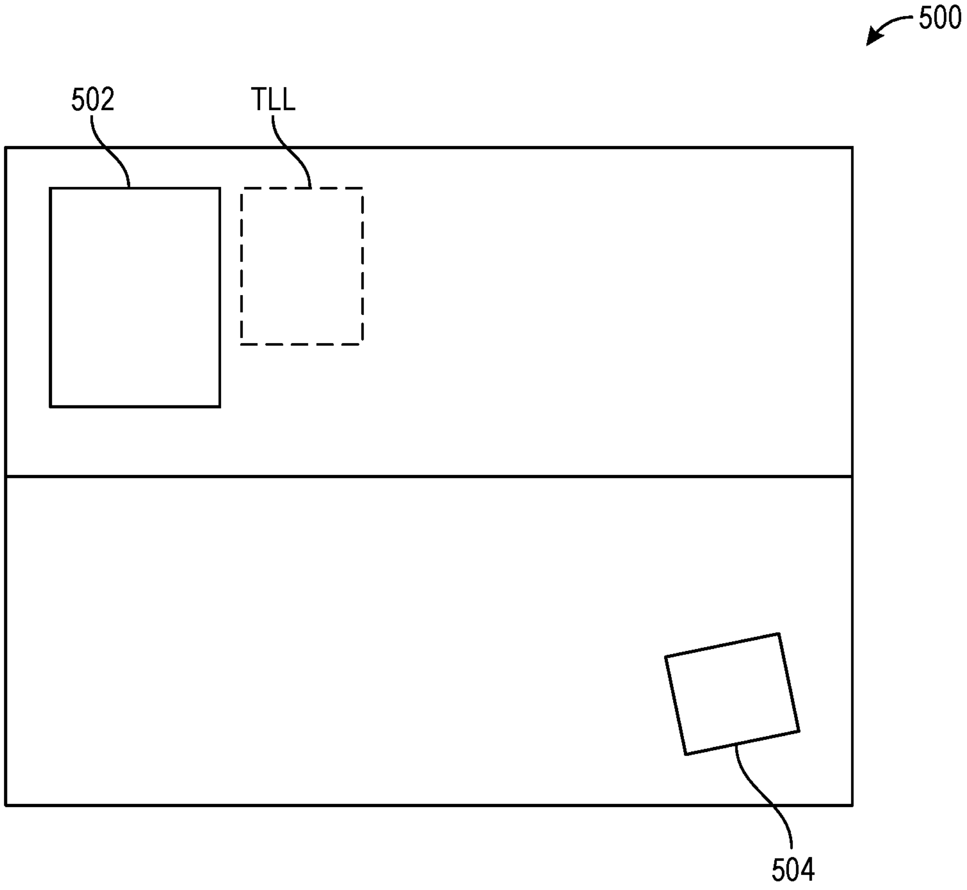
FIG. 5 is a top view of an object with preexisting items on a top surface thereof.

FIG. 5 is a top view of an object 500 with preexisting items (e.g., a preexisting label 502, a preexisting image 504) on a top surface thereof. The object 500 is an example of an object that can be processed within a robotic system (e.g., the robotic system 100 of FIG. 1), including visual analysis and labeling by a multi-purpose labeling system (e.g., the labeling systems 300, 400 of FIGS. 3 and 4). When the object 500 interfaces with the labeling system, the top and/or one or more sides of the object 500 can be visually analyzed (e.g., by the visual analysis module 312 of FIG. 3 or the visual analysis unit 416 of FIG. 4) to identify: (i) a surface texture thereof, (ii) identifying (e.g., identity) and/or other information regarding the object 500, and/or (iii) a pose of the object 500 relative to the robotic system and/or the labeling system.

The robotic system and/or the labeling system can derive a target labeling location (e.g., TLL) for placing a label (e.g., by the labeling system) on the object 500 and/or print the label for placing on the object 500 based on the surface texture, the identity information, and/or other information regarding the object 500, one or more object surfaces, and/or items on the object surfaces. Further, the robotic system and/or the labeling system can align a labeling module (e.g., the labeling module 316 of FIG. 3) with the target labeling location, and the labeling system can place a label thereat based on the object pose.

In some embodiments, the labeling system can derive the target labeling location separate from (e.g., non-overlapping) and/or relative to the preexisting items. The labeling system can operate according to one or more predetermined rules for deriving the target labeling location. For example, the labeling system can derive the target labeling location based on rules that prefer one or more regions (e.g., halves, quadrants, corner regions, etc.), use the preexisting label 502 and/or the preexisting image 504 as a reference, or the like. As illustrated in FIG. 5, the labeling system can derive the target labeling location based on using the preexisting label 502 as a reference. Accordingly, the labeling system can align a first reference edge of the target labeling location (e.g., the edge closest to a shared object edge) with a first edge of the preexisting label 502. The labeling system can identify a second reference edge (e.g., an edge perpendicular to the first reference edge and facing a larger or an inner area of the object). The labeling system can derive a pose of the target labeling location based on the second reference edge, such as according to a separation distance and/or aligning the corresponding second edge of the label parallel to the second reference edge. The labeling system can also derive the target labeling location as covering or partially overlapping with one or more preexisting items, based on the object information and/or information identified from the preexisting items. For example, the labeling system can derive the target labeling location for a label as covering an outdated label, covering a label unrelated to the contents of the object, partially covering a previous label (e.g., adhering a barcode label over a previous barcode), or any similar location.

Figure 6:
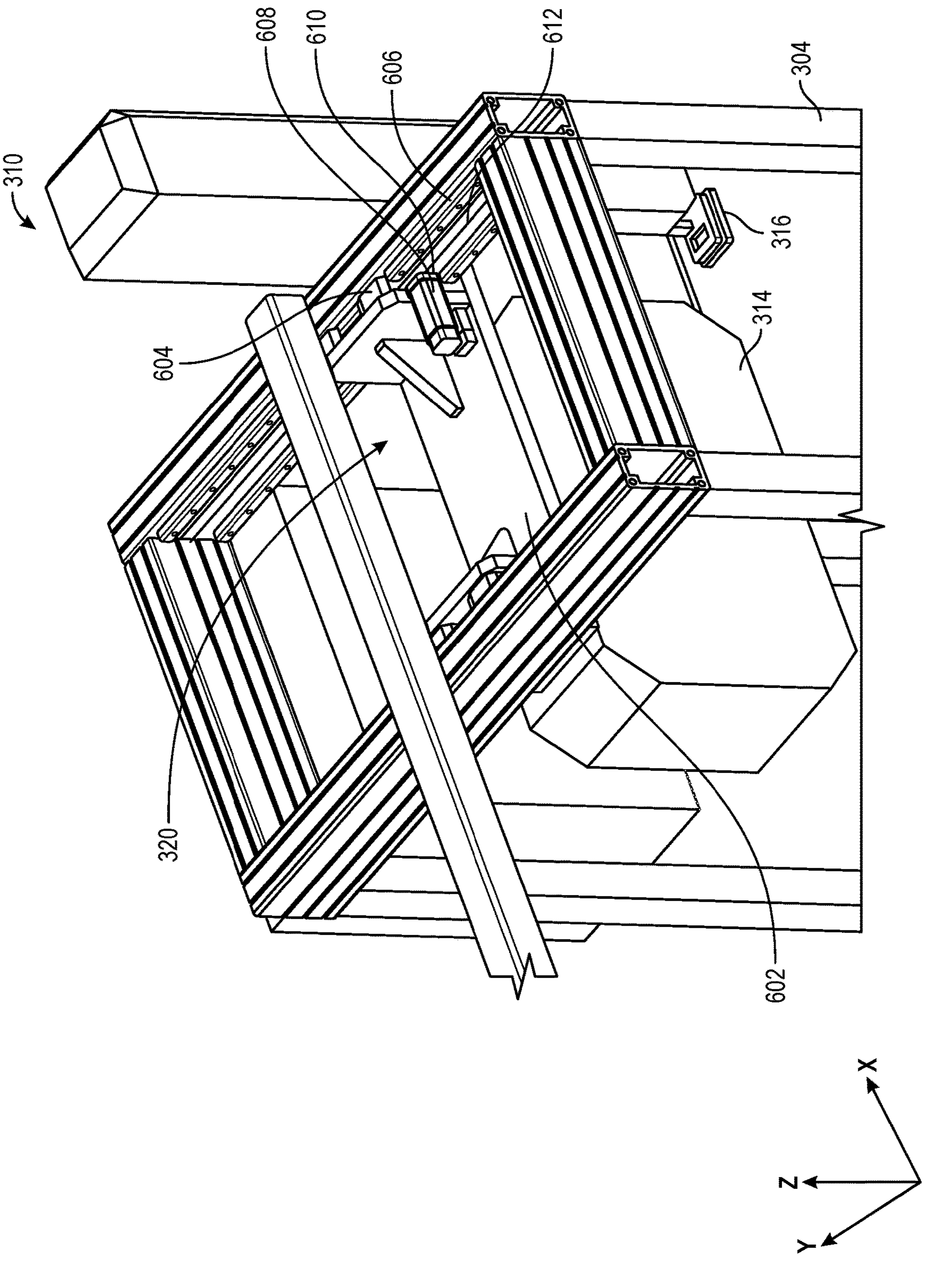
FIG. 6 is a top perspective view of a lateral-motion module of the multi-purpose labeling system, configured in accordance with some embodiments of the present technology.

FIG. 6 is a top perspective view of the lateral-motion module 320 of the labeling systems, configured in accordance with some embodiments of the present technology. The lateral-motion module 320 can be a sub-element of the labeling alignment assembly of FIGS. 3 and 4, and/or can operate to align the labeling module 316 with the target labeling location along the y-axis. The lateral-motion module 320 can include a lateral frame 602 moveably coupled to an upper portion of the assembly frame 304. The lateral frame 602 can be coupled to the upper portion using any suitable mechanism allowing the lateral-motion module 320 to translate along the y-axis. For example, the lateral frame 602 can be coupled to the upper portion by one or more carriages 604 riding on one or more lateral tracks 606 (e.g., rails, slides) coupled between the lateral frame 602 and a front and/or a back of the upper portion.

The lateral frame 602 can translate along the one or more tracks 606 using one or more motors controlled by the robotic system (e.g., the robotic system 100 of FIG. 1) and/or the labeling system 300. For example, one or more lateral rack gears 612 can be coupled to the one or more lateral tracks 606 and/or the upper portion of the assembly frame 304, and one or more lateral servos 608 can be coupled to the lateral frame 602. Each lateral servo 608 can include one or more lateral pinion gears 610 interfacing with the one or more lateral rack gears 612, and can selectively drive the lateral pinion gears 610 to translate the lateral-motion module 320. In some embodiments, the one or more lateral rack gears 612 can instead be coupled to the lateral frame 602, and the one or more lateral servos 608 can be coupled to the assembly frame 304. As illustrated in FIG. 6, the lateral-motion module 320 includes: (i) the lateral frame 602 coupling the printing module 314 to the upper portion of the assembly frame 304, (ii) eight lateral carriages 604 (e.g., four at the front and at the back), (iii) four lateral tracks 606 (e.g., two at the front and two at the back), and (iv) two lateral servos 608 and two lateral rack gears 612 (e.g., one at the front and one at the back).

Figure 7:
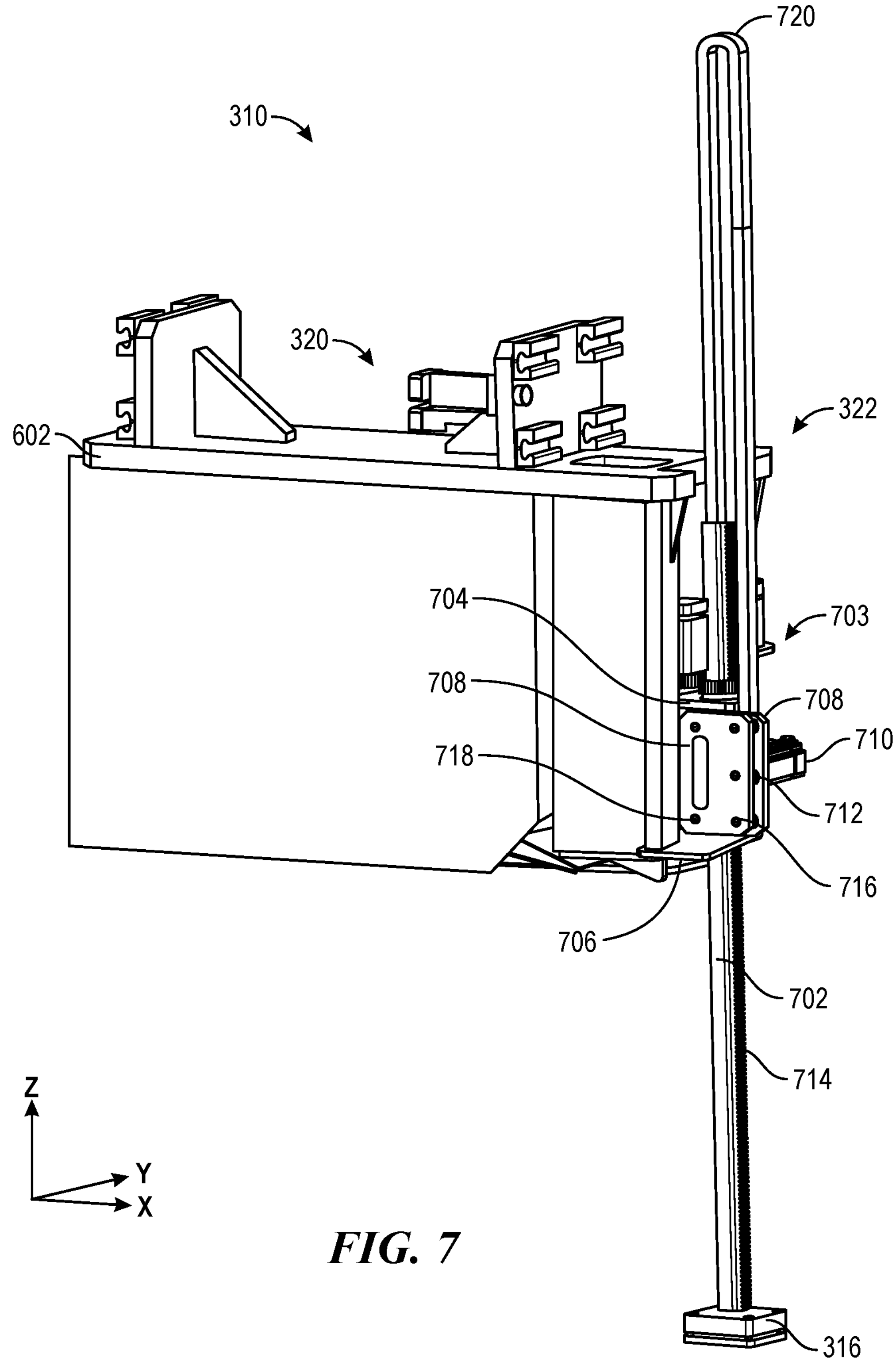
FIG. 7 is a front perspective view of a vertical-motion module of the multi-purpose labeling system, configured in accordance with some embodiments of the present technology.

FIG. 7 is a front perspective view of the vertical-motion module 322 of the labeling systems, configured in accordance with some embodiments of the present technology. For ease of reference, selected elements of the labeling assembly 310 are excluded, such as the assembly frame 304, portions of the lateral-motion module 320, and the protective cover of FIG. 3 over portions of the vertical-motion module 322. As shown in FIG. 7, the vertical-motion module 322 can be a sub-element of the labeling alignment assembly of FIGS. 3 and 4, and can align the labeling module 316 with the target labeling location along the z-axis (e.g., press the labeling module 316 against the object). The vertical-motion module 322 can include a vertical shaft 702 (e.g., a hollow or solid beam, pole, or similar structure) moveably coupled to the printing module 314, the label flipping module 318, the lateral-motion module 320, and/or another structure of the labeling assembly 310, the vertical shaft 702 carrying the labeling module 316.

The vertical shaft 702 can be coupled to the labeling assembly 310 using any suitable mechanism allowing the labeling module 316 to translate along the z-axis. For example, the vertical shaft 702 can be carried by a vertical support assembly 703 stationary along (relative to the labeling assembly 310), and rotatable about, the z-axis. The vertical support assembly 703 can include an upper vertical support bracket 704 and a lower vertical support bracket 706 coupled to one or more structures extending from the lateral frame 602. Further, opposing side brackets 708 (or a single side bracket 708) can extend between the upper bracket 704 and the lower bracket 706. In some embodiments, the vertical support assembly 703 can exclude either the upper bracket 704 or the lower bracket 706. The vertical shaft 702 can extend through the upper bracket 704 and/or the lower bracket 706, and between the side brackets 708.

The vertical shaft 702 can translate along the z-axis using one or more motors controlled by the robotic system and/or the labeling system. For example, one or more vertical rack gears 714 can be coupled to the vertical shaft 702, and one or more vertical servos 710 can be coupled to the vertical support assembly 703. Each vertical servo 710 can include one or more vertical pinion gears 712 interfacing with the one or more vertical rack gears 714, and can selectively drive the vertical pinion gears to translate the vertical shaft 702. Additionally, the vertical support assembly 703 can include one or more vertical support gears 716 and/or vertical support cams 718 (e.g., cam rollers, camming surfaces) to maintain alignment of the vertical shaft 702 along the z-axis and allow smooth motion of the vertical shaft 702 along the z-axis. The vertical support gears 716 can interface with the one or more vertical rack gears 714. The vertical support cams 718 can interface with surfaces of the vertical shaft 702. As illustrated in FIG. 7, the vertical-motion module 322 includes (i) the vertical shaft 702, (ii) the upper bracket 704, (iii) the lower bracket 706, (iv) two opposing side brackets 708, (v) one vertical servo 710 with the vertical pinion gear 712 coupled thereto, (vi) one vertical rack gear 714, (vii) three vertical support gears 716, and (viii) two vertical support cams 718.

The labeling module 316 can be coupled to a bottom end (e.g., an end closest to the conveyor 332, 432 of FIGS. 3, 4) of the vertical shaft 702 using any suitable method for rigidly or selectively coupling the labeling module 316 thereto. For example, the labeling module 316 can be coupled to the vertical shaft 702 using a press-fit or threaded connection, one or more fasteners, or any similar mechanical or chemical (e.g., epoxy, adhesive) method. In some embodiments, the labeling module 316 (or portions thereof) can be integrally formed with the vertical shaft 702. Wires, tubing, and/or other structures (collectively, "supply lines") supporting operation of the labeling module 316 can pass through a hole along a length of the vertical shaft 702 (e.g., when the vertical shaft 702 is hollow) and/or along an exterior surface thereof. Portions of the one or more supply lines extending above the vertical shaft 702 can be protected and/or organized within a supply line bundle 720, such as one or more cable tracks or carriers; wire ties, straps, and/or clips; cable sleeves; and/or any other suitable wire covering and/or organizer.

In some embodiments, the vertical-motion module 322 can alternatively align the labeling module 316 with the target labeling location along the z-axis by vertically translating the labeling module 316 and one or more other components of the labeling assembly (e.g., one or more elements of the labeling assembly except the vertical-motion module 322). For example, the vertical-motion module 322 can be moveably coupled to the assembly frame 304, the lateral-motion module 320 of FIG. 6 can be moveably coupled to vertical-motion module 322, and the remainder of the labeling assembly 310 can be coupled to the lateral-motion module 320. As a further example, the lateral-motion module 320 can be moveably coupled to the assembly frame 304, the vertical-motion module 322 can be moveably coupled to the lateral-motion module 320, and the remainder of the labeling assembly 310 can be coupled to the vertical-motion module 322. In some embodiments, the labeling assembly 310 can include multiple vertical-motion modules 322. For example, the labeling assembly 310 can include a vertical-motion module 322 between the assembly frame 304 and the lateral-motion module 320, and between the lateral-motion module and labeling module 316. By including the vertical-motion module 322 between the assembly frame and the remainder of the labeling assembly 310 and/or including multiple vertical-motion modules 322, the labeling system 310 can benefit from additional range of motion along the z-axis, speed of operation, and a reduced maximum torque and/or lateral force experienced by the stamper.

In some embodiments, the vertical-motion module 322 can alternatively include a mechanism the same as or similar to the mechanism that allows the lateral-motion module 320 of FIG. 6 to translate along the y-axis. In these embodiments, the labeling assembly 310, the labeling module 316, or the lateral-motion module 320 can be coupled to the assembly frame 304 by one or more carriages (similar to the carriages 604 of FIG. 6) riding on one or more vertical tracks (similar to the lateral track 606 of FIG. 6) coupled to the assembly frame 304. The vertical-motion module 322 can then similarly include vertical rack gears interfacing with pinion gears driven by vertical servo motors to align the labeling module 316 with the target labeling location. In these embodiments, the labeling system 310 can benefit from increased efficiency and accuracy in moving the labeling module 316 to the target labeling location in comparison to, for example, free-moving and/or six degrees of freedom (e.g., arm-like) robotics, increasing overall throughput.

Figure 8A:
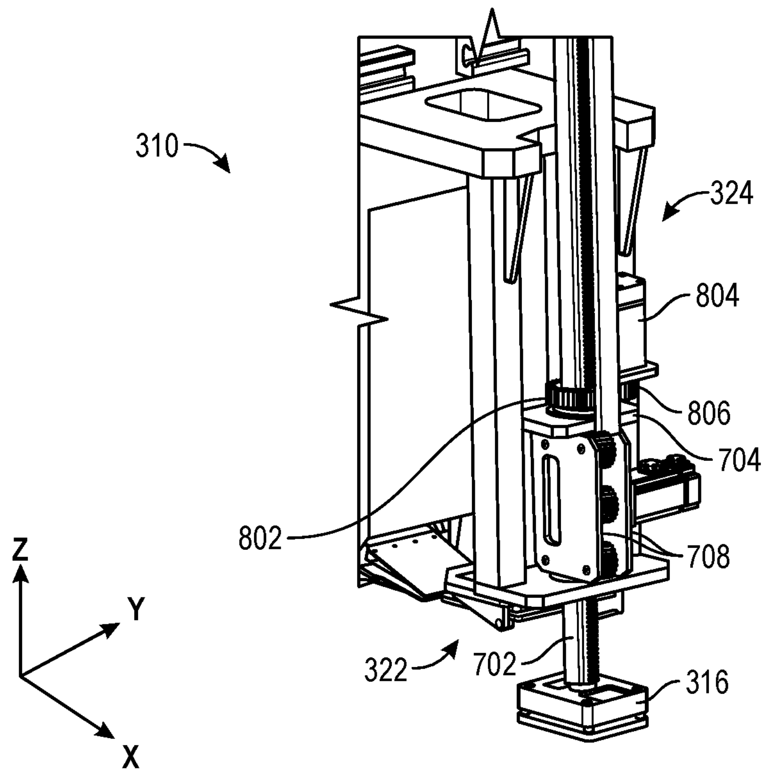
FIGS. 8A and 8B are front perspective views of a rotary module of the multi-purpose labeling system, configured in accordance with some embodiments of the present technology.
Figure 8B:
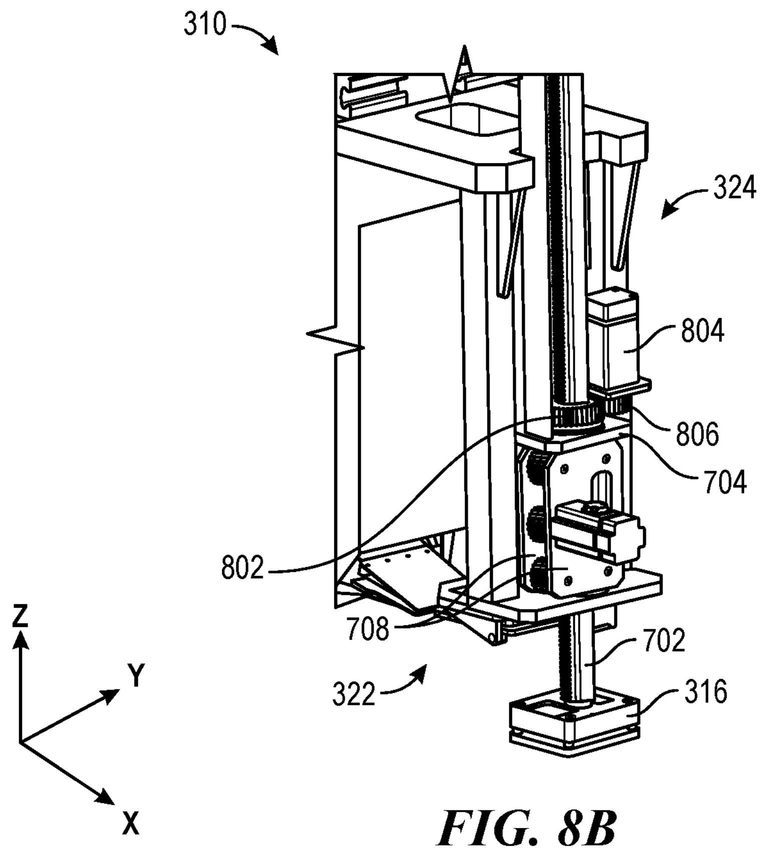

FIGS. 8A and 8B are front perspective views of the rotary module 324 of the labeling systems, configured in accordance with some embodiments of the present technology. Specifically, FIG. 8A illustrates the rotary module 324 in an x-axis-aligned position (e.g., 0° rotation), and FIG. 8B illustrates the rotary module 324 in a y-axis-aligned position (e.g., +90° rotation). For ease of reference, selected elements of the labeling assembly 310 are excluded, such as the assembly frame 304, portions of the lateral-motion module 320 and the printing module 314, and the protective cover of FIG. 3 over portions of the rotary module 324. As shown in FIGS. 8A and 8B, the rotary module 324 can be a subelement of the labeling alignment assembly of FIGS. 3 and 4, and can align the labeling module 316 with the target labeling location about the z-axis. For example, the rotary module 324 can rotate the labeling module 316 any incremental rotational amount between + and/or −180° from the x-axis.

The rotary module 324 can include a rotating portion interfacing with the vertical-motion module 322, and can be rotated by a stationary portion coupled to the printing module 314, the label flipping module 318, the lateral-motion module 320, and/or any other structure of the labeling assembly 310. The rotating portion can include one or more alignment gears 802 configured to rotate the vertical shaft 702 about the z-axis. The alignment gear 802 can be rotatably coupled to the upper and/or lower brackets 704, 706, and can interface with the vertical support brackets 708 and/or vertical shaft 702 to rotate the vertical shaft 702. For example, the alignment gear 802 can rigidly couple to and rotate the upper and/or lower brackets 704, 706. As a further example, the vertical shaft 702 can extend through an opening of the alignment gear 802, and an inner surface of the opening can press against and rotate the vertical shaft 702.

The stationary portion can rotate the rotating portion using one or more motors controlled by the robotic system and/or the labeling system 300. For example, one or more rotary servos 804 can each selectively drive a rotary pinion gear 806 interfacing with the alignment gear 802 to rotate the vertical-motion module 322. As illustrated in FIGS. 8A and 8B, the rotary module 324 includes the alignment gear 802 coupled to the upper vertical support bracket 704, the rotary servo 804 coupled to one of the beams extending from the lateral frame 602, and the rotary pinion gear 806 coupled thereto. Although elements of the alignment assembly as described can include servos and/or gearing to translate and/or rotate portions thereof, any suitable mechanism for rotating and/or translating can be used. For example, elements of the alignment assembly can additionally or alternatively include electric (e.g., magnetic), pneumatic, and/or hydraulic linear and/or rotary actuators; belt and pulley assemblies; additional gearing (e.g., worm gears, gear trains, gearbox assemblies); and/or any similar mechanism for operating the alignment assembly.

Figure 9:
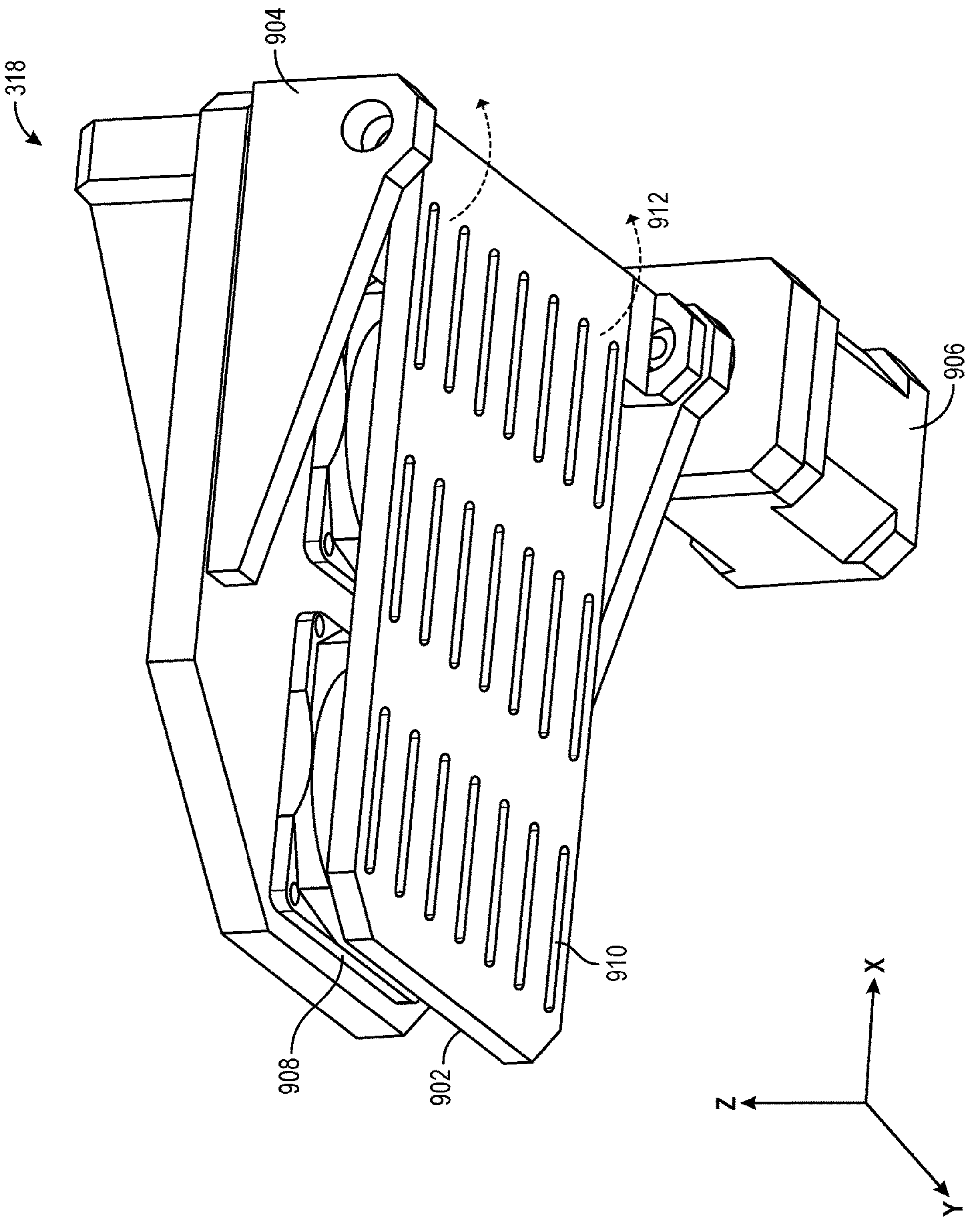
FIG. 9 is a front perspective view of a label flipping module of the multi-purpose labeling system, configured in accordance with some embodiments of the present technology.

FIG. 9 is a front perspective view of a label flipping module (e.g., the label flipping module 318) of the labeling system, configured in accordance with some embodiments of the present technology. The label flipping module 318 can receive one or more labels from the printing module 314 of FIGS. 3, 4, and prepare and/or transfer the one or more labels to the labeling module 316 of FIGS. 3, 4. For example, the label flipping module 318 can receive one or more labels requiring flipping, folding, and/or peeling; can perform one or more of these operations to the label; and transfer the label to the labeling module 316. The label flipping module 318 can include a transfer plate 902 rotatably coupled to a label flipping frame 904. One or more motors 906 controlled by the robotic system and/or the labeling system 300 can rotate the transfer plate 902 between (and/or incrementally between) a receiving (e.g. first) position (as illustrated in FIG. 9) and a transfer (e.g., second) position opposite the receiving position. For example, the transfer plate 902 can rotate 150°, 160°, 170°, 180°, or 190°, or any incremental amount greater than, less than, or therebetween, along the arrows 912 from the receiving position to the transfer position. The label can be held against a bottom surface of the transfer plate 902 (in the receiving position) by a flipping suction assembly 908 (e.g., a vacuum assembly) drawing air through slots 910 in the transfer plate 902. Additional operational details of the label flipping module are described below.

Figure 10:
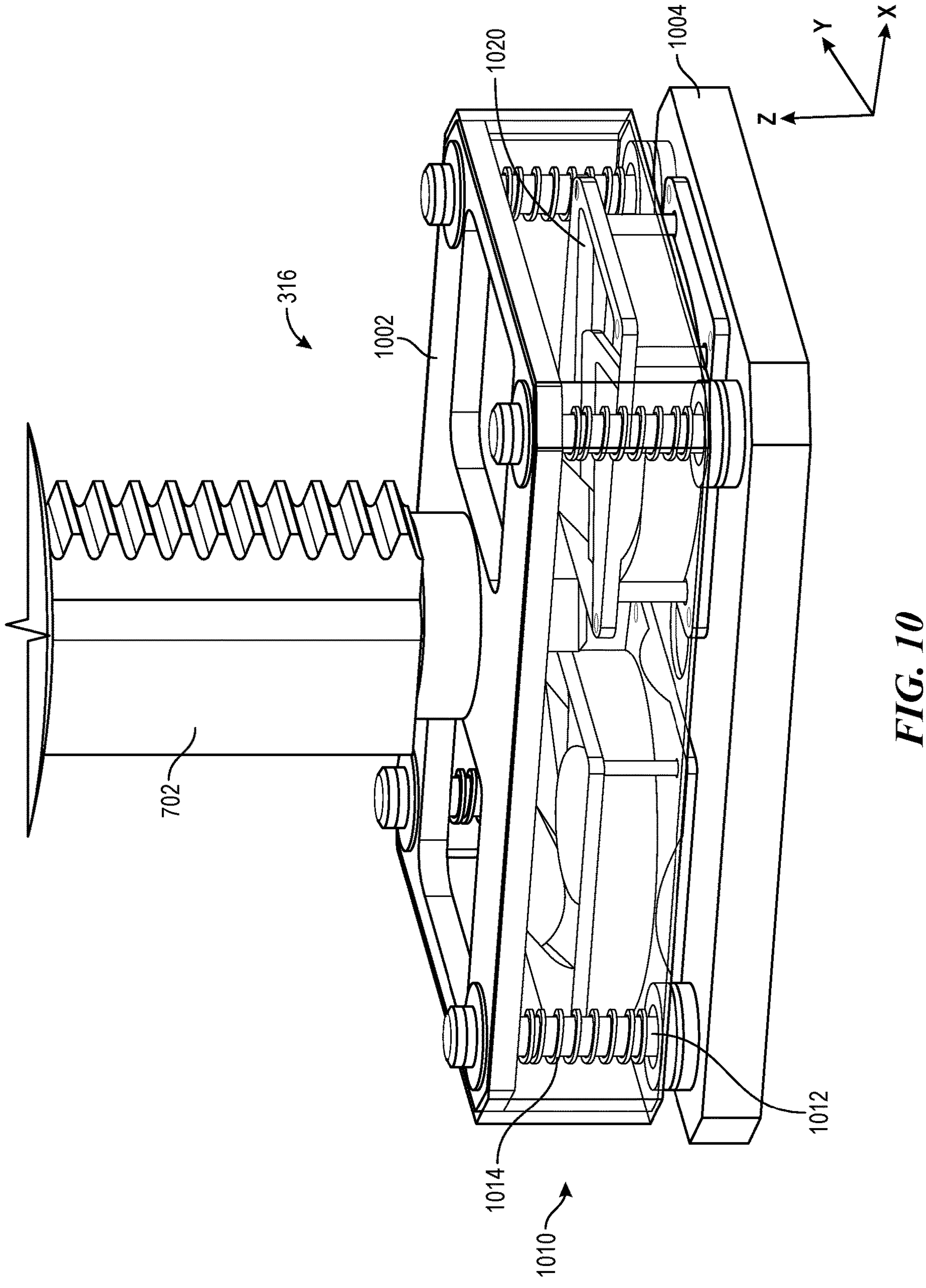
FIG. 10 is a front perspective view of a labeling module of the multi-purpose labeling system, configured in accordance with some embodiments of the present technology.

FIG. 10 is a front perspective view of the labeling module 316 of the labeling system, configured in accordance with some embodiments of the present technology. The labeling module 316 can receive one or more labels from the printing module 314 of FIGS. 3, 4 and/or the labeling module 316 of FIGS. 3, 4 for adhering to the object. The labeling module 316 can include an upper labeling bracket 1002 coupled to the vertical shaft 702, a labeling plate 1004 spaced therefrom by a compliance assembly 1010, and a labeling suction assembly 1020 (e.g., a vacuum assembly). The compliance assembly 1010 can allow a bottom surface of the labeling plate 1004 to align (e.g., be parallel, coplanar, etc.) with the labeling surface of the object. The compliance assembly 1010 can include one or more compliance pillars 1012 moveably coupling and retaining the upper labeling bracket 1002 and the labeling plate 1004, and a spring mechanism 1014 biasing the upper labeling bracket 1002 and the labeling plate 1004 apart. For example, the compliance pillars 1012 can be rigidly coupled to the upper labeling bracket 1002 and slideably coupled to the labeling plate 1004. The spring mechanism 1014 can include helical compression springs around the compliance pillars 1012 allowing the labeling plate 1004 to move relative to the upper labeling bracket 1002. The labeling suction assembly 1020 can hold one or more labels against the bottom surface of the labeling plate 1004 by drawing air through slots extending through the labeling plate 1004. In some embodiments, the labeling plate 1004 can include an adhesive resistant material to prevent portions of the label from adhering to the labeling module 316.

Figure 11A:
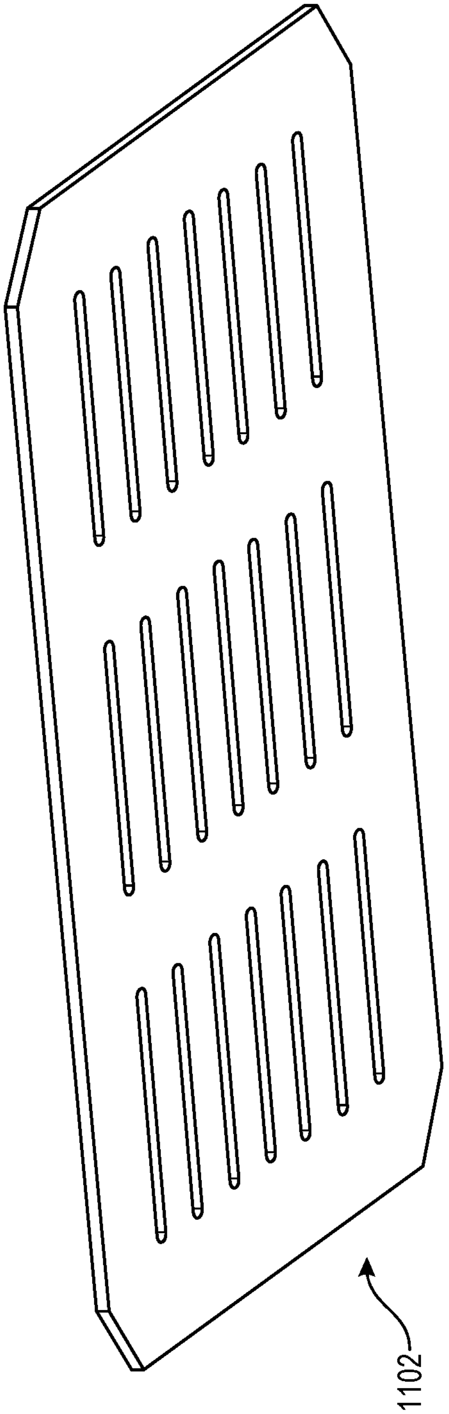
FIGS. 11A and 11B are bottom perspective views of label adapters of the multi-purpose labeling system, configured in accordance with some embodiments of the present technology.
Figure 11B:
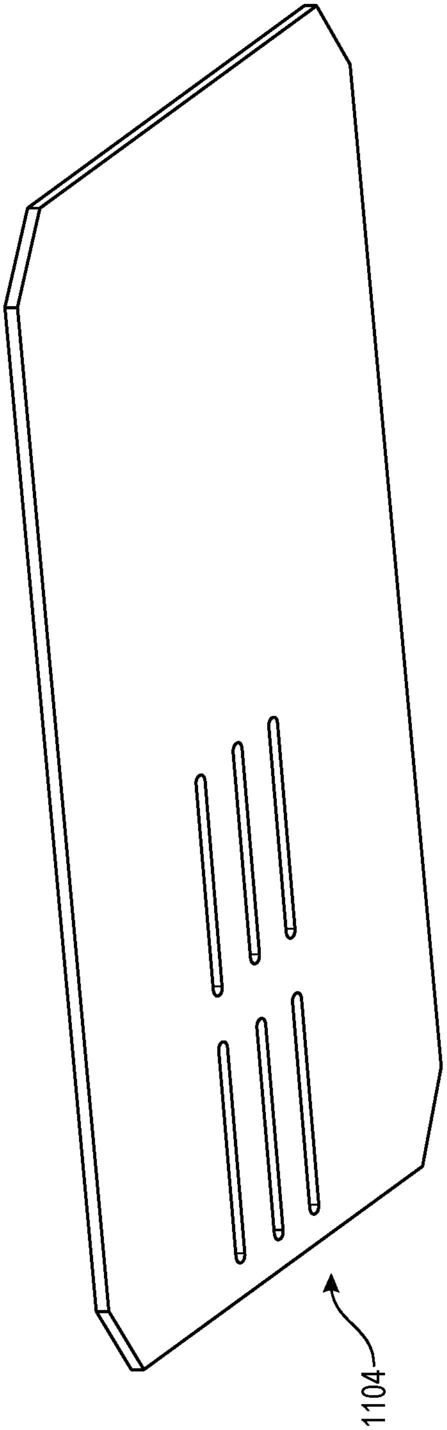

FIGS. 11A and 11B are bottom perspective views of label adapters 1102, 1104 of the labeling system, configured in accordance with some embodiments of the present technology. Specifically, FIG. 11A illustrates a first label adapter 1102 with an array of twenty-one air passthrough slots; and FIG. 11B illustrates a second label adapter 1104 with an array of six passthrough slots. The first label adapter 1102 of FIG. 11A or the second label adapter 1104 of FIG. 11B can be coupled (e.g., adhered to, fastened to) to the label flipping module 318 of FIG. 9 and/or the labeling module 316 of FIG. 10 to improve performance of the flipping suction assembly 908 of FIG. 9 and/or the labeling suction assembly 1020 of FIG. 10, respectively. In some embodiments, the first or second label adapter 1102, 1104 can be excluded and an array of passthrough slots can instead extend through the transfer plate 902 and/or the labeling plate 1004.

The array of passthrough slots of the first label adapter 1102 can correspond with the shape and/or size of labels that can cover a majority of the bottom surface of the transfer plate 902 of FIG. 9 and/or the labeling plate 1004 of FIG. 10. Similarly, the array of passthrough slots of the second label adapter 1104 can correspond with the shape and/or size of labels covering a minority of the bottom surface of the transfer plate 902 and/or the labeling plate 1004. By corresponding the array of passthrough slots with the shape and/or size of labels, a better seal can be formed between the label and the bottom surface of the transfer plate 902 and/or the labeling plate 1004 by the flipping suction assembly 908 and/or the labeling suction assembly, respectively. In some embodiments, the array of passthrough slots instead can correspond with any one or more additional label shapes and/or sizes, can correspond with labels held by the label flipping module 318 and/or the labeling module 316 at certain locations thereon, and/or can correspond with any other arrangement improving performance of the flipping suction assembly 908 and/or the labeling suction assembly 1020.

FIGS. 12-15 illustrate a process for labeling an object using the labeling system 300 of FIG. 3 and/or the robotic system, in accordance with some embodiments of the present technology. The process can generally include: (i) visually analyzing an object (e.g., 01) to derive a target labeling location (e.g., TLL) thereon and/or a pose thereof of FIG. 12, (ii) prepare a label for placing on the object of FIGS. 13A-14, and (iii) aligning the labeling module 316 with the target labeling location and placing the label thereat of FIG. 15. Although FIGS. 12-15 illustrate the labeling process regarding the labeling system 300, the labeling system 400 of FIG. 4 can follow one or more of the same and/or similar steps performed by corresponding elements thereof. For example, the conveyor assembly 430 of FIG. 4 can perform the operations described regarding the conveyor assembly 330 of FIG. 3, the visual analysis unit 416 of FIG. 4 can perform the operations described regarding the visual analysis module 312 of FIG. 3, and/or any other similar operations of the labeling system 300 of FIG. 3 that can be performed by a corresponding element of the labeling system 400 of FIG. 4.

Figure 12:
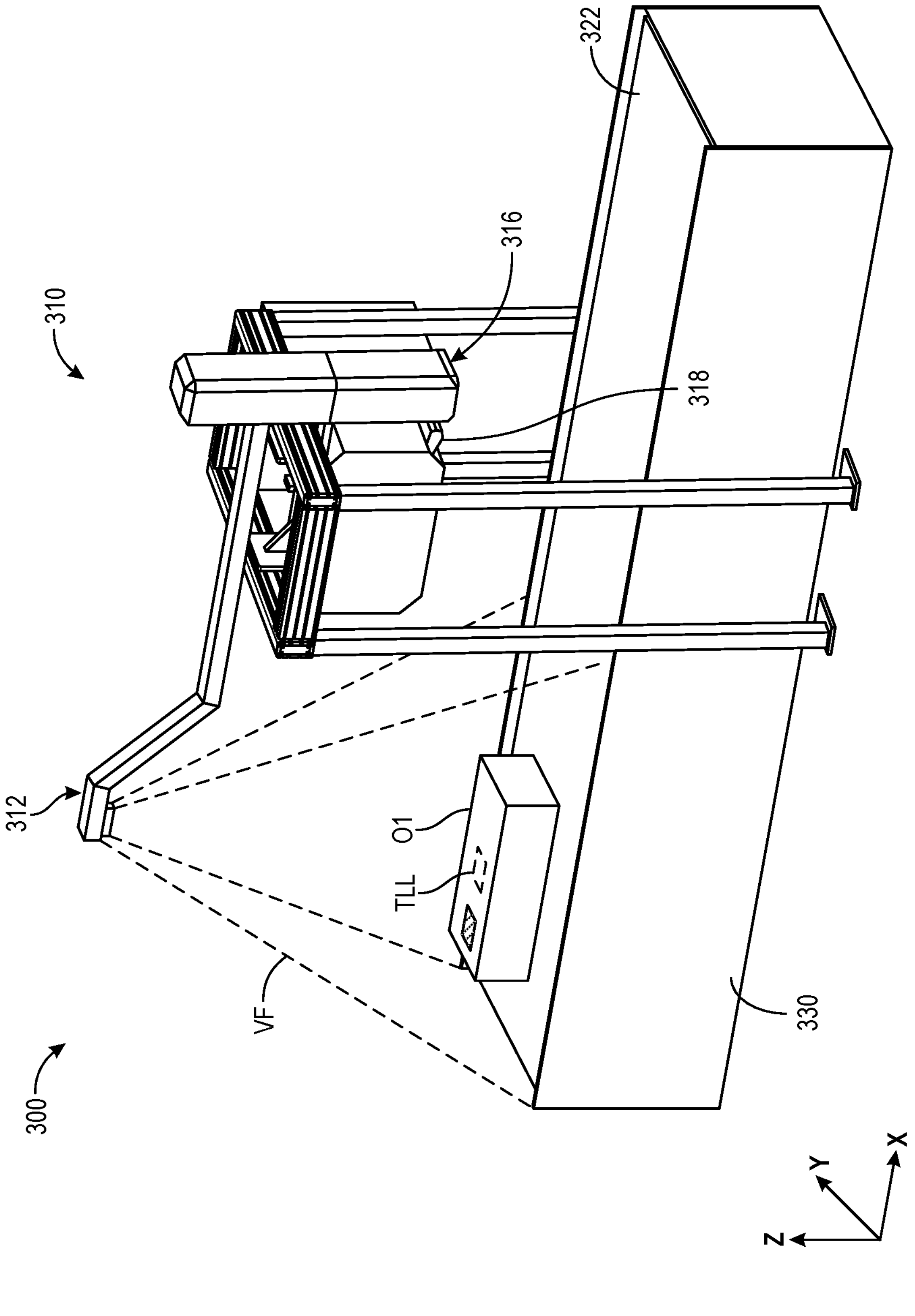
FIGS. 12-15 illustrate a process for labeling an object using the multi-purpose labeling system of FIG. 1, in accordance with some embodiments of the present technology.

FIG. 12 illustrates a front perspective view of the labeling system 300 visually analyzing the object to derive the target labeling location thereon and/or the pose thereof, in accordance with some embodiments of the present technology. For example, the conveyor 332 and/or the conveyor assembly 330 can move or hold the object, or a portion thereof, within the vision field (e.g., VF) of the visual analysis module 312. The one or more imaging devices of the visual analysis module 312 can collect object information regarding the physical and/or the identifying characteristics of the object. The labeling system 300 can use the collected object information to identify the object, derive the target labeling location on the object, and identify the pose (e.g., a first position pose) of the object relative to the conveyor assembly 330, the conveyor 332, the labeling system 300, and/or the robotic system while, in some embodiments, the object is spaced from the labeling module 316. Based on the identified object, target labeling location, and pose, the labeling system 300 can prepare the label of FIGS. 13A-14, and align the labeling module with the labeling module 316 and place the label on the object at the target labeling location of FIG. 15.

Figure 13A:
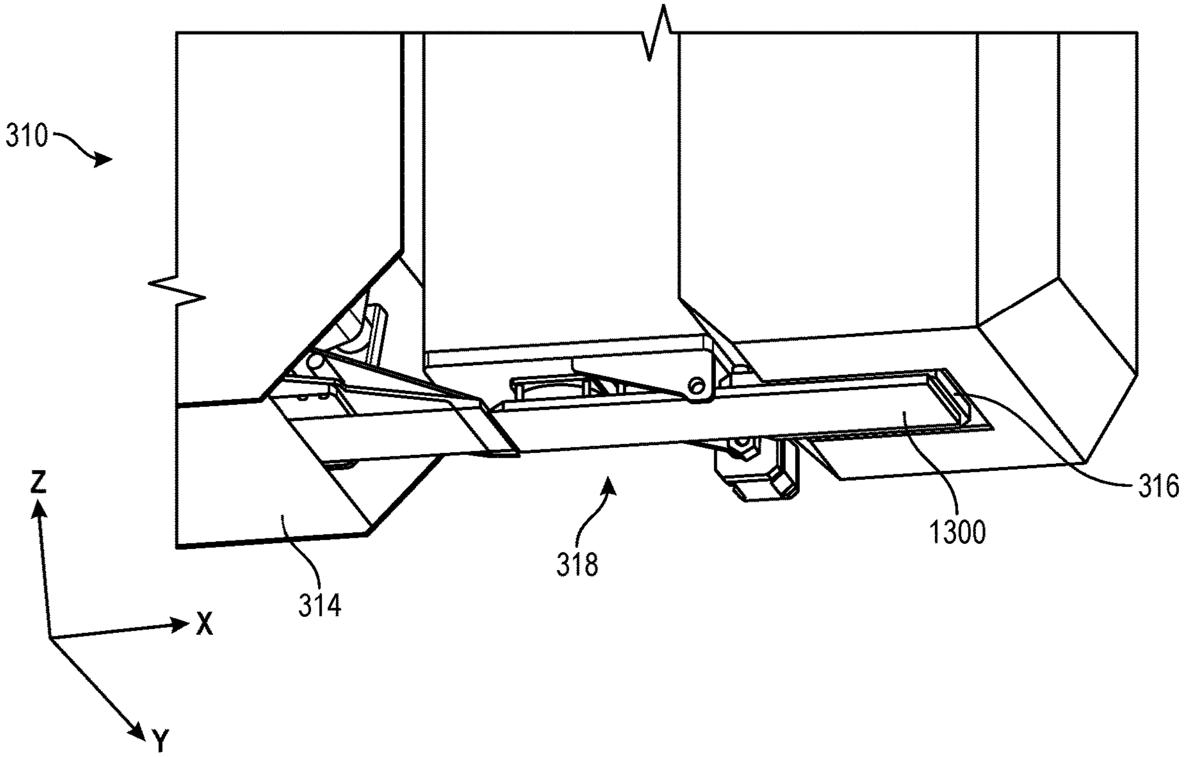
Figure 13B:
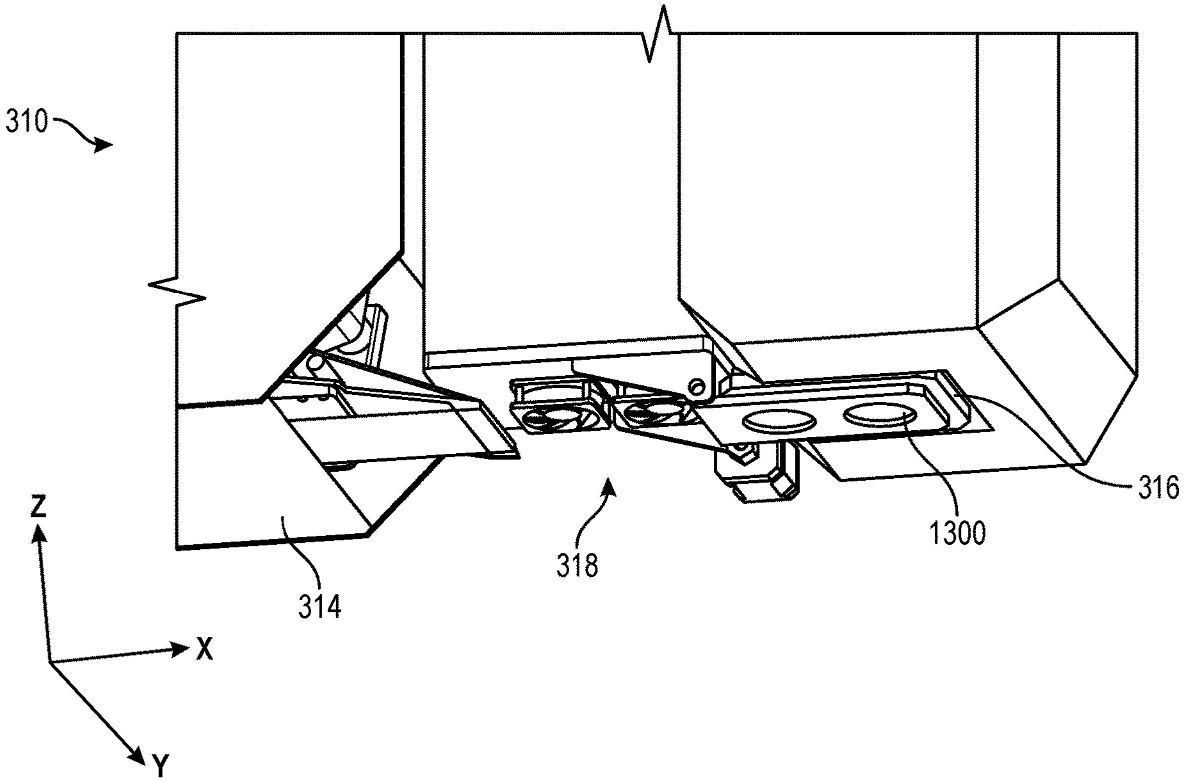
Figure 14:
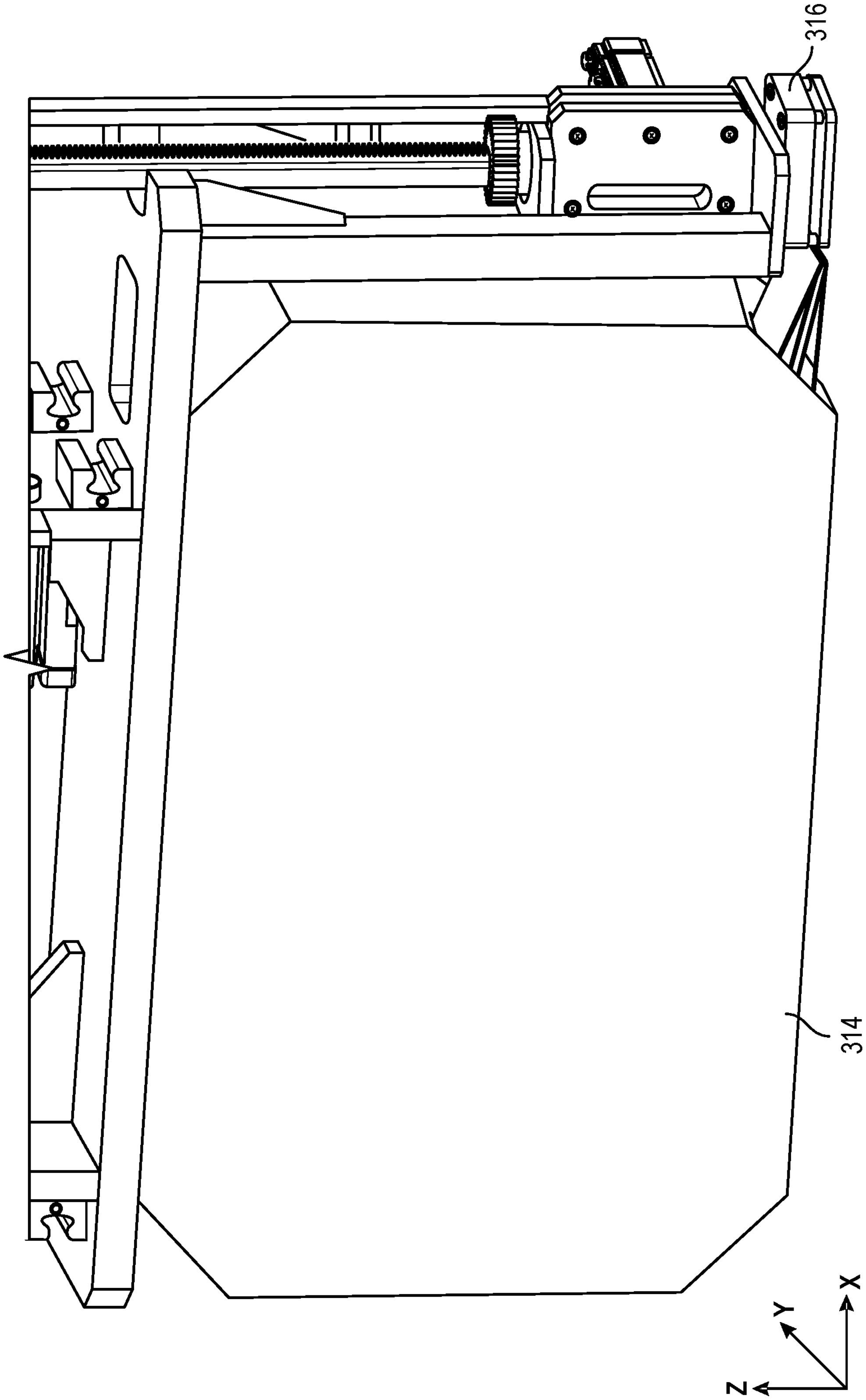

FIGS. 13A-14 illustrate front perspective views of selected components of the labeling assembly 310 preparing the label (e.g., a label 1300) for placing on the identified object, in accordance with some embodiments of the present technology. Specifically, FIGS. 13A and 13B illustrate the labeling assembly 310 including the label flipping module 318 between the printing module 314 and the labeling module 316; and FIG. 14 illustrates the labeling assembly 310 excluding the label flipping module 318 between the printing module 314 and the labeling module 316.

Regarding FIG. 13A, the label 1300 for the identified object, in some embodiments, can require folding after printing and/or prior to placement on the object. For example, the printing module 314 can print the label 1300 including a front portion extending over the bottom of the labeling module 316, and a back portion extending over the bottom of the label flipping module 318 (while the transfer plate 902 of FIG. 9 is in the receiving position). A bottom side (e.g., facing the conveyor 332) of the front and/or back portions of the label 1300 can include an adhesive for adhering the label 1300 together once folded. A top side of at least the back portion can include an adhesive for adhering the label 1300 to the object, and can include information printed thereon. A top side of at least the front portion can include information printed thereon.

Before and/or while the label 1300 extends from (e.g., is printed by, expelled from) the printing module 314, the flipping suction assembly 908 of FIG. 9 and/or the labeling suction assembly 1020 of FIG. 10 can engage to hold the label 1300 against the label flipping module 318 and/or the labeling module 316. Once the label 1300 is printed, as illustrated in FIG. 13B: (i) the label flipping module 318 can activate (e.g., the transfer plate 902 of FIG. 9 can rotate to the transfer position) to fold the label 1300, pressing and adhering the back portion of the label 1300 to the front portion, (ii) the flipping suction assembly 908 can disengage, and/or (iii) the label flipping module 318 can deactivate (e.g., the transfer plate 902 can return to the receiving position). As shown, the labeling suction assembly 1020 can then hold the prepared (e.g., folded) label 1300 with the adhesive (previously positioned on the top surface of the back portion) facing the object and the target labeling location.

In some embodiments, a label for the identified object can additionally or alternatively require flipping after printing. For example, the printing module 314 can print the label extending over the bottom of the label flipping module 318 with an adhesive for adhering the label to the object facing the label flipping module 318. In these embodiments, the label can include an adhesive on a top surface (e.g., facing the label flipping module 318), and can include information printed on and/or exclude adhesive on a bottom surface. Before, while, and/or after the label extends from the printing module 314, the flipping suction assembly 908 can engage to hold and temporarily adhere the label to the label flipping module 318. Once the label is printed and partially adhered to the label flipping module 318: (i) the label flipping module 318 can activate, (ii) the flipping suction assembly 908 can disengage, (iii) the labeling suction assembly 1020 can engage to hold label against the labeling module 316, and/or (iv) the label flipping module 318 can deactivate and the label can separate therefrom. The labeling suction assembly 1020 can hold the prepared (e.g., flipped) label with the adhesive (previously on the top surface) facing the object and the target labeling location.

In some embodiments, a label for the identified object can require neither folding nor flipping. For example, as illustrated in FIG. 14, the printing module 314 can be adjacent to the labeling module 316 (e.g., excluding the label flipping module 318) and can print the label directly to the labeling module 316. In these embodiments, the label can include an adhesive on a bottom surface (e.g., facing the conveyor 332), and can include information printed on and/or exclude an adhesive on a top surface. Before, while, and/or after the label extends from the printing module 314, the labeling suction assembly 1020 can engage to hold the label against the labeling module 316.

Figure 15:
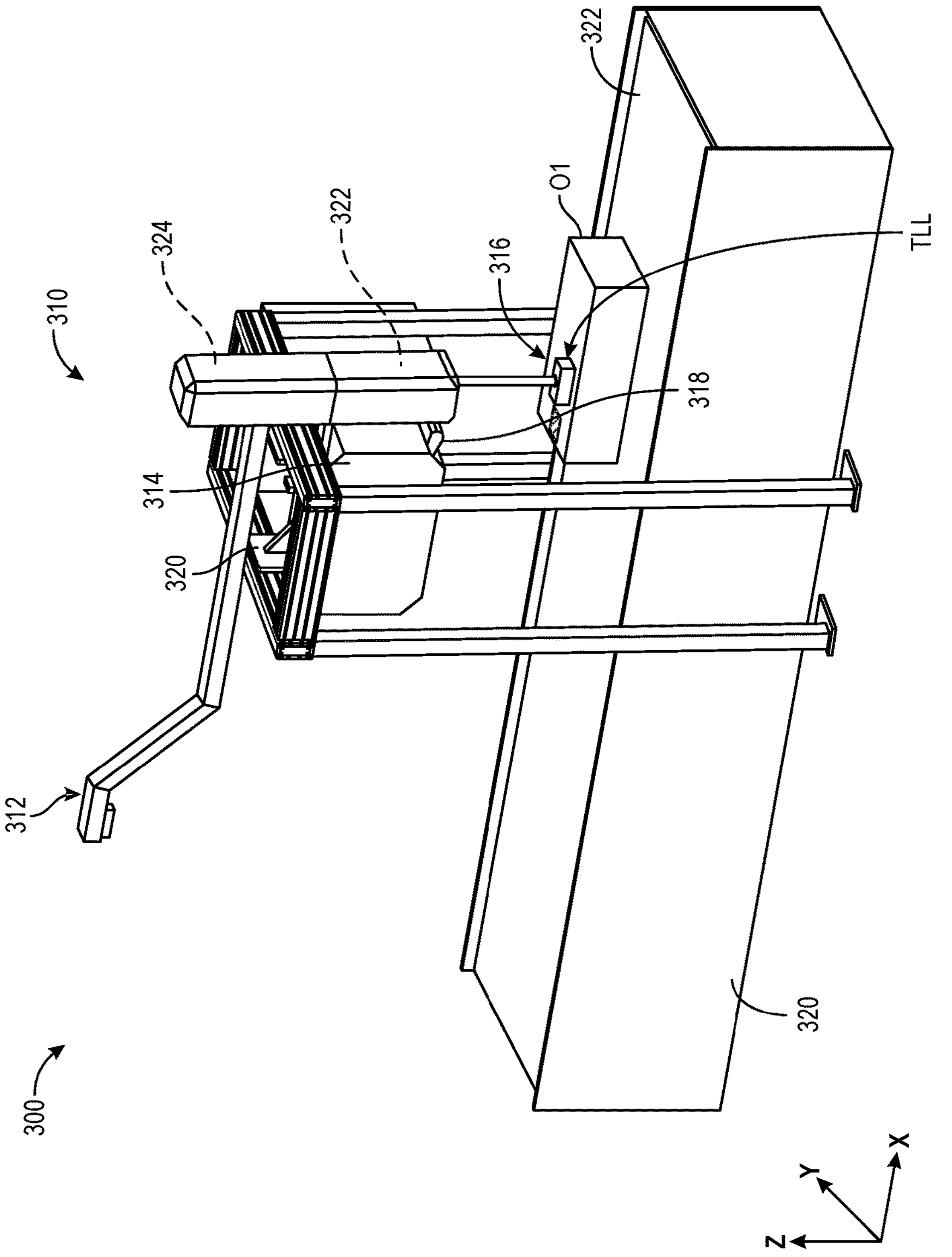

FIG. 15 illustrates a front perspective view of the labeling system 300 aligning the labeling module 316 with the target labeling location and placing the label thereat, in accordance with some embodiments of the present technology. For example, one or more of the alignment elements (e.g., the conveyor assembly 330, the conveyor 332, the lateral-motion module 320, the vertical-motion module 322, and/or the rotary module 324) can simultaneously and/or sequentially engage to move the object, or a portion thereof, under the labeling assembly 310 and align the labeling module 316 with the target labeling location (e.g., along and/or about the x, y, and/or z-axes). The vertical-motion module 322 can press the labeling module 316, with the prepared (e.g., printed, folded, flipped, and/or transferred) label held thereon, against the top surface of the object to adhere the label thereto. Once the label is adhered to the surface of the object, the labeling suction assembly 1020 can disengage (e.g., releasing the label and retracting from the top surface of the object). Additionally, the lateral-motion module 320, the vertical-motion module 322, and/or the rotary module 324 can reposition the labeling module 316 to receive a label for a subsequent object. For example, the labeling module 316 can be repositioned adjacent to the label flipping module 318 and/or the printing module 314.

Figure 16:
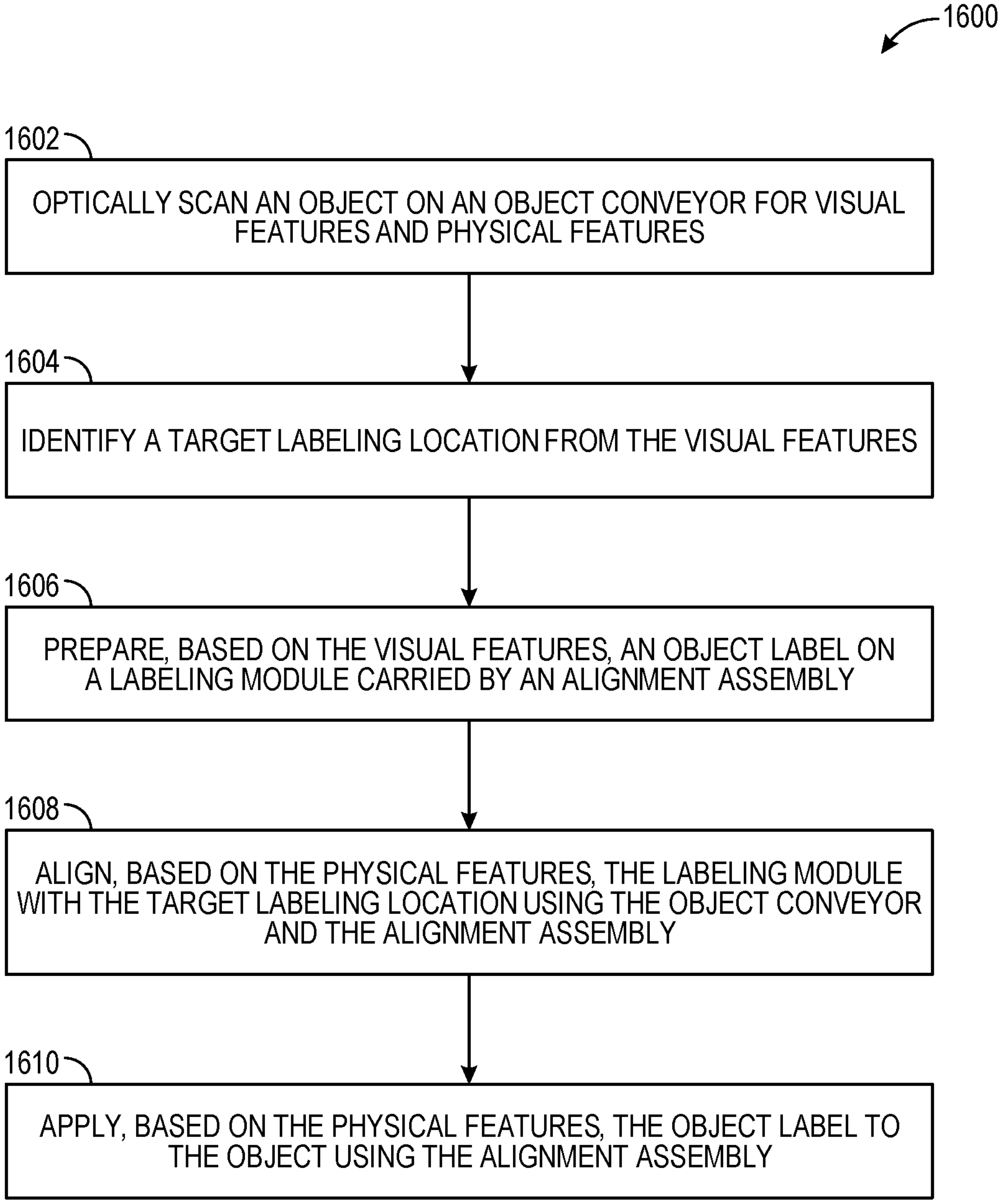
FIG. 16 is a flow diagram illustrating a process for labeling an object using the multi-purpose labeling system of FIG. 1, in accordance with some embodiments of the present technology.

FIG. 16 is a flow diagram illustrating a process 1600 for labeling an object using a labeling systems, in accordance with some embodiments of the present technology. The operations of process 1600 are intended for illustrative purposes and are non-limiting. In some embodiments, for example, the process 1600 can be accomplished with one or more additional operations not described, without one or more of the operations described, or with operations described and/or not described in an alternative order. As shown in FIG. 16, the process 1600 may include: optically scanning an object on an object conveyor for visual features and physical features (process portion 1602); identifying a target labeling location from the visual features (process portion 1604); preparing, based on the visual features, an object label on a labeling module carried by an alignment assembly (process portion 1606); aligning, based on the physical features, the labeling module with the target labeling location using the object conveyor and the alignment assembly (process portion 1608); and applying, based on the physical features, the object label to the object using the alignment assembly (process portion 1610). The process can be performed by, or implemented with, the robotic system 100 of FIGS. 1 and 2, the labeling system 300 of FIG. 3, the labeling system 400 of FIG. 4, and/or any similar robotic and/or labeling system, or a portion thereof.

Optically scanning an object on an object conveyor for visual features and physical features (process portion 1602) can include moving and/or holding the object, or a portion thereof, within a vision field of a visual analysis module and/or unit, and/or collecting information regarding the object with one or more imaging devices of the visual analysis module and/or unit. For example, the one or more imaging devices can collect information regarding visual features, such as one or more available labeling spaces (e.g., available labeling space) and/or one or more object identifier readings. The available labeling space can include surface areas of the object having minimum required dimensions and/or uniform texture, and/or excluding any recognizable patterns (e.g., barcode, QR code, letters or design markers, etc.). The one or more imaging devices can also collect information regarding physical features, such as a height, a width, and/or a length of the object, and/or additional exterior dimensions; and can collect information regarding physical features regarding the pose of the object relative to the labeling system and/or the robotic system. For example, regarding the object pose, the collected information can identify (or be used to identify) a distance and/or rotation of the object, and/or one or more object surfaces, relative to the labeling system or a portion thereof.

Identifying (e.g., deriving) a target labeling location from the visual features (process portion 1604) can include the labeling system and/or the robotic system analyzing the available labeling space to locate a location that satisfies one or more predetermined conditions for placing the label. For example, the location can correspond with a location within the available labeling space, a location dictated by industry standard, a location improving future handling of the object, and/or another locations facilitating more efficient object label reading, such as distancing the label from other surface contents, rotating the label along a certain orientation, etc.

Preparing, based on the visual features, an object label on a labeling module carried by an alignment assembly (process portion 1606) can include the labeling system and/or the robotic system instructing the labeling assembly to print and prepare the label on the labeling module. A printing module can print a label with information thereon based on the available labeling space and/or the one or more object identifier readings. For example, the printing module (or the labeling system and/or the robotic system) can select a type (e.g., shape, size, color, etc.) of label to print, and/or barcodes, QR codes, letters, and/or designs to print on the label. A label flipping module can then fold, flip, peel, and/or transfer the printed label to the labeling module. The labeling module can hold the printed label, with an adhesive facing the object, by engaging a suction assembly.

Aligning, based on the physical features, the labeling module with the target labeling location using the object conveyor and the alignment assembly (process portion 1608) can include engaging the object conveyor, a lateral-motion module, a vertical-motion module, and/or a rotary module to move the object, or a portion thereof, under the labeling assembly. Further, aligning can include deriving an object placement pose where the labeling module is aligned with the target labeling location. For example, based on at least the height, the width, the length, and/or the pose of the object at the visual analysis module and/or unit, the labeling system and/or the robotic system can derive the object placement pose where the object can be located under the labeling assembly and the labeling module can be aligned with the target labeling location (e.g., a location of the object where the target labeling location is within a region of possible orientations of the labeling module by the alignment assembly). The labeling system and/or the robotic system can also derive a motion plan to align the labeling module with the target labeling location while the object is at the placement pose. The motion plan can include offset distances between the target labeling location and the labeling module between the pose of the object at the visual analysis module and/or unit and the placement pose. The offset distances can include distances along and/or about the operating axes of the object conveyor and the elements of the alignment assembly. The object conveyor, the lateral-motion module, the vertical-motion module, and/or the rotary module can then selectively, simultaneously and/or sequentially, engage to reduce and/or eliminate the respective offset distances. In some embodiments, the vertical-motion module can maintain the offset distance between the target labeling location and the labeling module along the operating axis thereof above a certain threshold distance. For example, the offset along the z-axis can be maintained as at least, greater than, or less than 1 in, 2 in, or 3 in (2.5 cm, 5.1 cm, or 7.6 cm).

Applying, based on the physical features, the object label to the object using the alignment assembly (process portion 1610) can include pressing the label adhesive against the object at the target labeling location. For example, the vertical-motion module can engage to eliminate the offset distance between the target labeling location and the labeling module along the operating axis thereof. The vertical-motion module can further press the labeling module against the surface of the object (e.g., exert a force against the object via the labeling module), ensuring adhesion of the label to the object. The suction assembly can be disengaged and the labeling module retracted by one or more elements of the labeling assembly, and the object conveyor can move the object from under the labeling assembly and/or to a subsequent portion of the labeling system and/or the robotic system.

Aspects of one or more of the robotic and/or labeling systems described can efficiently and/or automatically prepare and adhere labels to objects within the robotic system. Labels can be adhered to avoid preexisting labels, images, and/or other items on the objects as they progress through the robotic system. By providing automatic labeling, the robotic and/or labeling system can improve object tracking and/or management without requiring human involvement, slowing operation of the robotic system, and/or removing the objects from the robotic system.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A multi-purpose labeling system, comprising:
   - a conveyor operable to move an object in a first direction;
   - a visual analysis module including an optical sensor directed toward the conveyor and configured to generate image data depicting the object;
   - at least one processor and at least one memory component with instructions that, when executed by the processor, perform operations including computing a placement location on the object based on the reading by the visual analysis module; and
   - a labeling assembly spaced from the conveyor in a second direction, the labeling assembly including:
     - a printer configured to print a label based on the image data,
     - a labeling module having a labeling plate configured to receive the label from the printer, and
     - an alignment assembly, the alignment assembly having:
       - a lateral-motion module configured to move the labeling module along a third direction,
       - a vertical-motion module configured to move the labeling module along the second direction, wherein the first, second, and third directions are orthogonal to each other, and
       - a rotary module configured to rotate the labeling module about the second direction, wherein the alignment assembly is operable to place the labeling plate adjacent to the placement location.

2. The multi-purpose labeling system of example 1 further comprising a label flipping module between the printer and the labeling module, the label flipping module configured to transfer the label from the printer to the labeling plate.

3. The multi-purpose labeling system of example 2, wherein the label flipping module includes:
   - a transfer plate rotatable between a first position and a second position, and
   - a vacuum assembly, wherein the transfer plate is positioned over the vacuum assembly in the first position, and wherein the flipping plate is positioned over the labeling plate in the second position.

4. The multi-purpose labeling system of example 1 further comprising an assembly frame carrying the labeling assembly over the conveyor and spacing the labeling assembly from the conveyor along the second direction.

5. The multi-purpose labeling system of example 4, wherein the lateral-motion module is moveably coupled to the assembly frame and carries the printer, the labeling module, the vertical-motion module, and the rotary module.

6. The multi-purpose labeling system of example 5, wherein the lateral-motion module is moveably coupled to the assembly frame using a carriage and track.

7. The multi-purpose labeling system of example 4, wherein the printer is rigidly coupled to the frame, and the lateral-motion module is moveably coupled to the assembly frame and carries the labeling module, the vertical-motion module, and the rotary module.

8. The multi-purpose labeling system of example 1, wherein the at least one processor and at least one memory component with instructions that, when executed by the processor, perform operations further including:
   - deriving a placement pose of the object for attaching the label at the placement location on the object; and
   - deriving a motion plan for operating the labeling assembly to attach the label according to the placement pose.

9. The multi-purpose labeling system of example 8, wherein computing the placement location includes identifying one or more labels, images, logos, or surface damages on the object, and computing the placement location as nonoverlapping with the one or more labels, images, logos, or surface damages on the object.

10. The multi-purpose labeling system of example 1 further comprising a visual analysis module frame independent of and spaced along the first direction from the labeling assembly, wherein the visual analysis module frame carries the visual analysis module over the conveyor and spacing the visual analysis module from the conveyor along the second direction.

11. The multi-purpose labeling system of example 1, wherein the labeling module includes a compliance assembly configured to align the labeling plate with the surface of the object when the labeling plate is adjacent thereto.

12. The multi-purpose labeling system of example 1, wherein the image data generated by the visual analysis module includes both 2D image data and/or 3D image data.

13. A multi-purpose labeling system, comprising:
   - one or more controllers having a computer-readable medium carrying instructions that, when executed, cause operations including:
     - causing a visual analysis module having an optical sensor directed toward a conveyor to generate image data depicting an object on the conveyor;
     - printing a label based on the image data;
     - transferring the label to a labeling module having a labeling plate,
     - computing a placement location on the object based on the reading by the visual analysis module, and
     - aligning, using an alignment assembly and the conveyor, the labeling module with the placement location, wherein the alignment assembly has:
       - a lateral-motion module configured to move the labeling module along a first direction,
       - a vertical-motion module configured to move the labeling module along a second direction, wherein the first and second directions are orthogonal to each other, and
       - a rotary module configured to rotate the labeling module about the second direction.

14. The multi-purpose labeling system of example 13, wherein the operations further include positioning the labeling plate, using the alignment assembly, adjacent to a surface of the object to place the label thereon.

15. The multi-purpose labeling system of example 13, wherein aligning the labeling module with the object based on the reading by the visual analysis module further includes:
   - identifying a first position pose of the object at a first position spaced from the labeling module;

evaluating an offset between the first position pose and the labeling module; and operating the conveyor, the lateral-motion module, the vertical-motion module, and the rotary module to eliminate the offset.

16. The multi-purpose labeling system of example 13, wherein aligning the labeling module with the object based on the reading by the visual analysis module further includes identifying a target labeling location for placing the label on a surface of the object.

17. A method for placing a label on an object using a multi-purpose labeling system, comprising:

optically scanning an object on an object conveyor for visual features and physical features, wherein the visual features include available labeling space and an object identifier reading, and wherein the physical features include dimensions of the object;

identifying a target labeling location from the available labeling space;

preparing, based on the object identifier reading, an object label on a labeling module carried by an alignment assembly;

aligning, based on the physical features, the labeling module with the target labeling location using the object conveyor and the alignment assembly; and applying, based on the physical features, the object label to the object using the alignment assembly.

18. The method of example 17, wherein the alignment assembly includes a lateral-motion module, and wherein aligning further includes:

advancing the object conveyor to align the labeling module with the target labeling location in a first direction, and engaging the lateral-motion module to align the labeling module with the target labeling location in a second direction.

19. The method of example 17, wherein the alignment assembly includes a rotary module, and wherein aligning further includes:

advancing the object conveyor to align the labeling module with the target labeling location in a first direction, and engaging the rotary module to rotationally align the labeling module with the target labeling location.

20. The method of example 17, wherein alignment assembly includes a vertical-motion module, and wherein applying further includes engaging the vertical-motion module to rotationally align the labeling module to adhere the object label to the object.

CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A multi-purpose labeling system, comprising:

a printer configured to print a label based on image data of an object;

a labeling assembly having a labeling plate configured to receive the label from the printer;

a label flipping assembly between the printer and the labeling assembly, the label flipping assembly configured to fold the label by flipping a first portion of the label while a second portion of the label contacts the labeling assembly; and an alignment assembly, the alignment assembly having:

a lateral-motion assembly configured to move the labeling assembly along a lateral direction, a vertical-motion assembly configured to move the labeling assembly along a vertical direction, wherein the vertical and lateral directions are orthogonal to each other, and a rotary assembly configured to rotate at least a part of the vertical-motion assembly and to rotate the labeling assembly about the vertical direction, wherein the alignment assembly is operable to place the labeling plate adjacent to a placement location on the object, the placement location being based on the image data of the object.

2. The multi-purpose labeling system of claim 1, wherein the label flipping assembly includes:

a transfer plate rotatable between a first position and a second position, and a vacuum assembly, wherein the transfer plate is positioned over the vacuum assembly in the first position, and wherein the transfer plate is positioned over the labeling plate in the second position.

3. The multi-purpose labeling system of claim 1, further comprising an assembly frame configured to carry the labeling assembly over a conveyor and to space the labeling assembly from the conveyor along the vertical direction.

4. The multi-purpose labeling system of claim 3, wherein the lateral-motion assembly is moveably coupled to the assembly frame and is configured to carry the printer, the labeling assembly, the label flipping assembly, the vertical-motion assembly, and the rotary assembly.

5. The multi-purpose labeling system of claim 4, wherein the printer is rigidly coupled to the assembly frame, and the lateral-motion assembly is moveably coupled to the assembly frame and is configured to carry the labeling assembly, the label flipping assembly, the vertical-motion assembly, and the rotary assembly.

6. The multi-purpose labeling system of claim 3, wherein the lateral-motion assembly is moveably coupled to the assembly frame using a carriage and track.

7. The multi-purpose labeling system of claim 1, further comprising at least one processor and at least one memory component with instructions that, when executed by the processor, perform operations including:

deriving a placement pose of the object for attaching the label at the placement location on the object; and deriving a motion plan for operating the labeling assembly to attach the label according to the placement pose.

8. The multi-purpose labeling system of claim 1 wherein the lateral direction is a first lateral direction, wherein the multi-purpose labeling system further comprises a frame independent of and spaced apart from the labeling assembly along a second lateral direction different from the first lateral direction, wherein the frame is configured to carry an optical sensor over a conveyor and to space the optical sensor from the conveyor along the vertical direction.

9. The multi-purpose labeling system of claim 1, wherein the labeling assembly includes a compliance assembly configured to align the labeling plate with a surface of the object when the labeling plate is adjacent thereto.

10. The multi-purpose labeling system of claim 1, wherein the image data includes 2D image data and/or 3D image data.

11. A multi-purpose labeling system, comprising:

one or more controllers having a computer-readable medium carrying instructions that, when executed, cause operations including:

printing a label based on image data of an object;

transferring the label to a labeling assembly having a labeling plate;

folding the label, wherein folding the label comprises flipping a first portion of the label while a second portion of the label is on or adjacent to the labeling assembly; and aligning, using an alignment assembly, the labeling assembly with a placement location on the object, wherein the alignment assembly has:

a lateral-motion assembly configured to move the labeling assembly along a first direction, a vertical-motion assembly configured to move the labeling assembly along a second direction, wherein the first and second directions are orthogonal to each other, and a rotary assembly configured to rotate the labeling assembly about the second direction.

12. The multi-purpose labeling system of claim 11, wherein the operations further include positioning the labeling plate, using the alignment assembly, adjacent to a surface of the object to place the label thereon.

13. The multi-purpose labeling system of claim 11, wherein aligning the labeling assembly with the object further includes:

identifying a first position pose of the object at a first position spaced from the labeling assembly;

evaluating an offset between the first position pose and the labeling assembly; and operating the lateral-motion assembly, the vertical-motion assembly, and the rotary assembly to eliminate the offset.

14. A method for placing a label on an object using a multi-purpose labeling system, comprising:

obtaining two-dimensional (2D) image data representing visual features of an object and obtaining three-dimensional (3D) image data representing physical features of the object, wherein the visual features include available labeling space and an object identifier reading, and wherein the physical features include dimensions of the object;

identifying a target labeling location from the available labeling space, wherein identifying the target labeling location is based on the 2D image data and includes identifying and avoiding (1) surface damages on the object and (2) one or more labels, images, or logos on the object based on the visual features and the physical features;

preparing, based on the object identifier reading, an object label on a labeling assembly carried by an alignment assembly;

folding the object label on the labeling assembly, wherein folding the object label comprises flipping a first portion of the object label while a second portion of the object label is in contact with the labeling assembly;

aligning, based on the physical features, the labeling assembly with the target labeling location using the alignment assembly; and applying, based on the physical features, the object label to the object using the alignment assembly.

15. The method of claim 14, wherein the alignment assembly includes a lateral-motion assembly, and wherein aligning further includes:

engaging the lateral-motion assembly to align the labeling assembly with the target labeling location in a lateral direction.

16. The method of claim 14, wherein the alignment assembly includes a vertical-motion assembly, and wherein applying further includes engaging the vertical-motion assembly to vertically align the labeling assembly to adhere the object label to the object.

17. The method of claim 16, wherein:

the alignment assembly further includes a rotary assembly; and aligning further includes engaging the rotary assembly to rotate at least a part of the vertical-motion assembly and to rotationally align the labeling assembly with the target labeling location.

* * * * *